(12) United States Patent
Richardson et al.

(10) Patent No.: US 8,213,538 B2
(45) Date of Patent: Jul. 3, 2012

(54) METHODS AND APPARATUS FOR IMPROVED UTILIZATION OF AIR LINK RESOURCES IN A WIRELESS COMMUNICATIONS SYSTEM

(75) Inventors: Thomas Richardson, South Orange, NJ (US); Hui Jin, Jersey City, NJ (US); Rajiv Laroia, Far Hills, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1043 days.

(21) Appl. No.: 11/945,720

(22) Filed: Nov. 27, 2007

(65) Prior Publication Data

US 2008/0298494 A1    Dec. 4, 2008

Related U.S. Application Data

(60) Provisional application No. 60/940,660, filed on May 29, 2007.

(51) Int. Cl.
   *H04L 27/04* (2006.01)
(52) U.S. Cl. .................. 375/299; 375/267; 375/347
(58) Field of Classification Search .............. 375/299, 375/267, 347
   See application file for complete search history.

(56) References Cited

U.S. PATENT DOCUMENTS

| | | | |
|---|---|---|---|
| 2006/0203713 A1 | 9/2006 | Laroia et al. | |
| 2006/0269005 A1 | 11/2006 | Laroia et al. | |
| 2007/0004465 A1* | 1/2007 | Papasakellariou et al. | ... 455/571 |
| 2007/0071127 A1* | 3/2007 | Gore et al. | ..................... 375/267 |
| 2007/0165104 A1* | 7/2007 | Khan et al. | .................. 348/14.02 |
| 2008/0013500 A1* | 1/2008 | Laroia et al. | .................. 370/338 |
| 2009/0238290 A1 | 9/2009 | Imai et al. | |

FOREIGN PATENT DOCUMENTS

| | | |
|---|---|---|
| JP | 2006520558 | 9/2006 |
| JP | 2007180666 A | 7/2007 |
| RU | 2107989 | 3/1998 |

(Continued)

OTHER PUBLICATIONS

Kim, H. et al.: "Optimal Beamforming for Multicasting Data in CMHP," Advanced Communication Technology, The 9th International Conference On, IEEE, PI, Feb. 1, 2007, pp. 2096-2100, XP030185157, ISBN: 978-89-5519-131-8.

(Continued)

*Primary Examiner* — Kevin Kim
(74) *Attorney, Agent, or Firm* — Michelle Gallardo; Nicholas J. Pauley; Jonathan T. Velasco

(57) ABSTRACT

Methods and apparatus for improving the utilization of air link resources in a wireless communications system, e.g., an OFDM MIMO system, including a base station with multiple transmit antennas are described. Superposition signaling in the downlink is employed. The superimposed signal includes a first transform result signal and a second lower power signal. The first transform result signal is generated from a first signal, which uses position modulation, e.g., including null components and high power non-null components. Different components of the first transform result signal are directed to different transmit antennas. The first transform result signal communicates information to a first wireless terminal, e.g., a weak receiver. The non-null received elements of the first transform result signal are utilized by a second wireless terminal, e.g., a superior receiver, as pilots to determine a channel estimate. The second wireless terminal uses the determined channel estimate to demodulate received second signals.

99 Claims, 13 Drawing Sheets

FOREIGN PATENT DOCUMENTS

| | | |
|---|---|---|
| WO | 2004075470 | 9/2004 |
| WO | WO2006096678 A1 | 9/2006 |
| WO | WO2007049760 A1 | 5/2007 |

OTHER PUBLICATIONS

Jin, H. et al.: "Superposition by Position," Information Theory Workshop, 2006 IEEE Punta Del Este, Uruguay Mar. 13-17, 2006, Piscataway, NJ, USA, IEEE, Jan. 1, 2006, pp. 222-226, XP031035167, ISBN: 978-1-4244-0035-5.

International Search Report, PCT/US2008/064889—International Search Authority—European Patent Office—Nov. 6, 2008.

Written Opinion, PCT/US2008/064889—International Search Authority—European Patent Office—Nov. 6, 2008.

\* cited by examiner

METHODS AND APPARATUS FOR IMPROVED UTILIZATION OF AIR LINK RESOURCES IN A WIRELESS COMMUNICATIONS SYSTEM

RELATED APPLICATIONS

The present application claims the benefit of the filing date of the U.S. provisional patent application Ser. No. 60/940,660 filed May 29, 2007 which is assigned to the assignee to the present and which is hereby expressly incorporated by reference.

FIELD

The present invention relates to wireless communications methods and apparatus and, more particularly, to methods and apparatus for improving utilization of air link resources in a wireless communications system including a communications device with multiple transmit antenna elements.

BACKGROUND

In block hopped OFDM such as 802.20 standard with MIMO, support pilots are often embedded. Coarse and weak sampling of the channel results in performance loss. Independently, it is known that capacity can be increased by superposition coding. It would be beneficial if novel method and apparatus could increase wireless system capacity.

SUMMARY

Various embodiments are directed to methods and apparatus for improving the utilization of air link resources in a wireless communications system including a communications device, e.g., a base station, with multiple transmit antenna elements. In various embodiments, the base station concurrently uses a plurality of transmit antenna elements and uses superposition signaling in the downlink. Various novel features are particularly well suited to wireless communications systems implementing MIMO; however, many features are also beneficial when implemented in non-MIMO configurations.

In some embodiments, a base station transmits superimposed downlink signals using a plurality of antenna elements over a set of time-frequency resources, e.g., a set of OFDM tone-symbols. The wireless terminals to which the signals are directed may use a single receive antenna or multiple receive antenna elements. The superimposed transmitted signal includes a first transform result signal and a second signal. The first transform result signal is a high power signal, while the second signal is a low power signal. A first signal, which is a position coded signal, e.g., a mixture of nulls and non-null high power QPSK modulation symbols, is subjected to one of a plurality of predetermined transforms to generate the first transform result signal. Different elements of the transform are different complex constants corresponding to the different transmit antenna elements. In some embodiments, the different complex constants represent different amounts of phase shift. Different portions of the first transform result signal correspond to and are output on different transmit antenna elements.

A first wireless terminal, e.g., an inferior receiver, to which the first signal information is being communicated, receives the high power first transform result signal, decodes the signal and recovers the information being communicated. A second wireless terminal, e.g., a superior receiver, to which second signal information is being communicated, can process the received first transform result signal, and utilize the high power non-null components of the first transform result signal as pilots in determining a channel estimate or refining an ongoing channel estimate. The obtained channel estimate can then be utilized by the second wireless terminal in demodulation of the received symbols being communicated corresponding to the second signal. Thus, in accordance with various embodiments, capacity is increased by sharing the air link resource and providing pilots to the superior receiver while simultaneously transmitting information to the inferior user.

In various embodiments, the transform used in generating the first transform result signal is changed, e.g., from one OFDM symbol transmission time interval to the next OFDM symbol transmission time interval, in accordance with a predetermined pattern known to both the base station and the wireless terminal. In some such embodiments, at least some of the different transforms utilized are linearly independent of each other.

A exemplary method of operating a base station in accordance with various embodiments includes: applying a first predetermined transform to a first signal to generate a first transform result signal; transmitting said first transform result signal using a predetermined combination of antennas and a first set of time and frequency transmission resources; and transmitting a second signal using said first set of time and frequency transmission resources and said predetermined combination of antennas, said second signal being transmitted with lower power than said first transform result signal on at least one antenna used in transmitting the first transform result signal. An exemplary base station in accordance with various embodiment includes: a plurality of antenna elements; a transform module for applying a first predetermined transform to a first signal to generate a first transform result signal to be used to produce a combined signal; a superposition module for combining said first transform result signal with a second signal to produce a combined signal, said second signal having a lower power level than said first signal; and a transmission control module for controlling transmission of different portions of said combined signal using different antenna elements on a set of time and frequency transmission resources.

An exemplary method of operating a wireless terminal includes: receiving first and second signals on the same set of time and frequency resources, decoding said first signal; performing a channel estimation operation using said first signal to generate a channel estimate; and using the generated channel estimate to perform a decoding operation on the second signal. An exemplary wireless terminal in accordance with various embodiments includes: a receiver for receiving first and second signals on the same set of time and frequency resources, a first signal recovery module for decoding said first signal; a channel estimation generation module for generating a channel estimate using said first signal; and a second signal recovery module for performing a decoding operation on said second signal using the generated channel estimate to perform a decoding operation on the second signal.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
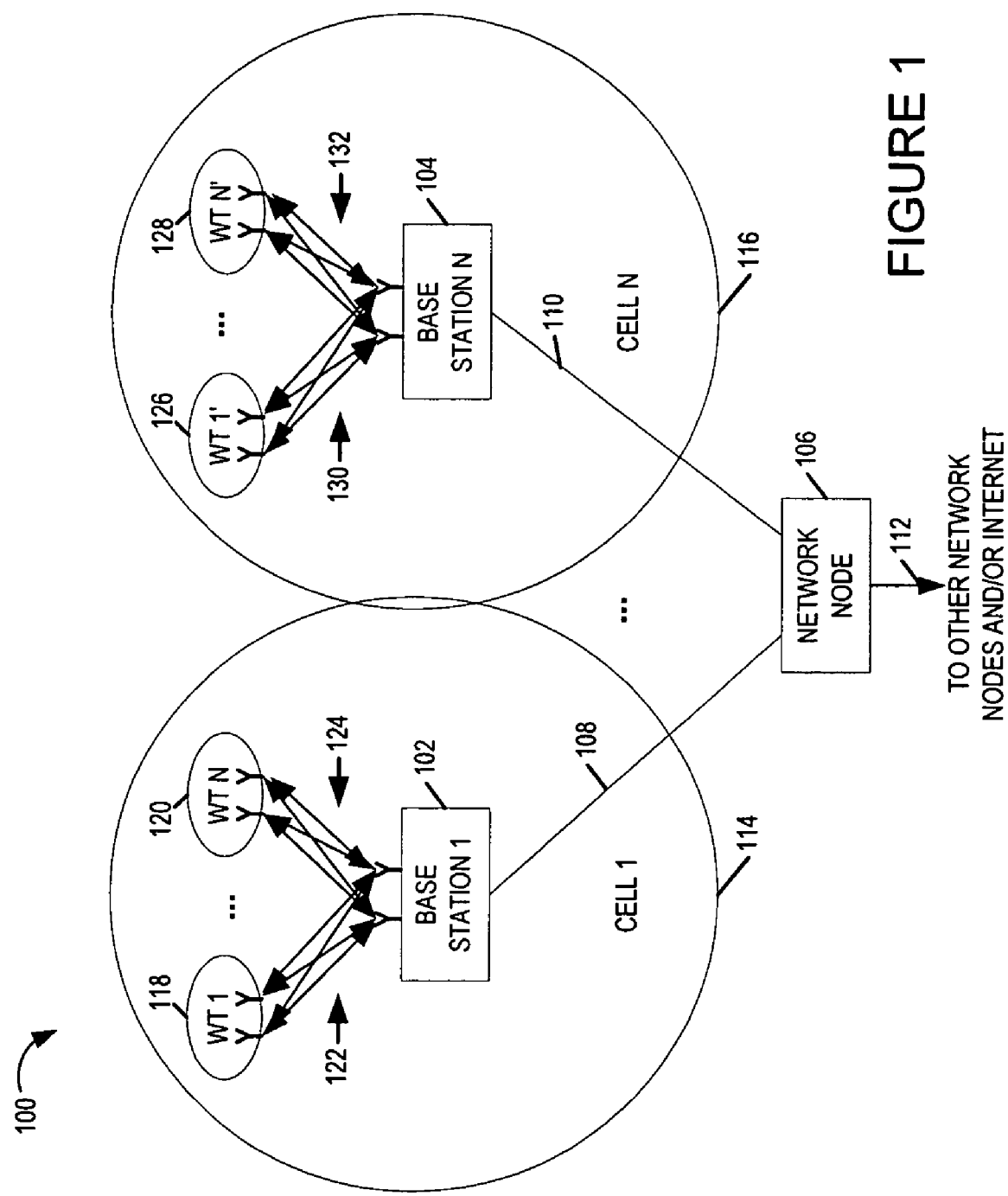
FIG. 1 is a drawing of an exemplary wireless communications system in accordance with various embodiments.

FIG. 1 is a drawing of an exemplary wireless communications system 100 in accordance with various embodiments. Exemplary wireless communications system 100 is, e.g., a multiple access orthogonal frequency division multiplexing (OFDM) wireless communications system including base stations which use multiple transmit antenna elements and support superposition signaling in the downlink. Various novel implemented methods facilitate channel estimation.

Exemplary wireless communications system 100 includes a plurality of base stations (base station 1 102, . . . , base station N 104), each base station has a corresponding wireless coverage area (cell 1 114, . . . , cell N 116), respectively. Multi-sector base stations are also used in some embodiments. The base station (102, 104) are coupled to a network node 106, e.g., a router, via network links (108, 110), respectively. Network node 106 is coupled to other network nodes, e.g., other routers, base stations, AAA nodes, home agent node, etc., and/or the Internet via network link 112. Network links (108, 110, 112) are, e.g., fiber optic links.

System 100 also includes a plurality of wireless terminals. At least some of the wireless terminals are mobile nodes which can move through the system 100. (WT 1 118, . . . , WT N 120) are currently coupled to base station 1 102 via wireless links (122, . . . , 124), respectively. (WT 1' 126, . . . , WT N' 128) are currently coupled to base station N 104 via wireless links (130, . . . , 132), respectively. As shown in FIG. 1, the WTs (118, 120, 126, 128) include multiple antenna elements and support communication with the base station using a MIMO antenna configuration. In some embodiments, for at least some wireless terminals or some base stations the same antennas are used for receive and transmit signals. In some embodiments, for at least some wireless terminals or some base stations different antennas are used for receive and transmit signals. Various embodiments include base stations with multiple transmit antennas and wireless terminals with multiple receive antennas. Some embodiments include base stations with multiple transmit antennas and wireless terminals using a single receive antenna. Some embodiments include base stations with multiple transmit antennas and a mixture of wireless terminals with some having a single receive antenna and others having a plurality of receive antennas. Some embodiments include a standalone base station with multiple transmit antenna elements and a plurality of wireless terminals.

Figure 13:
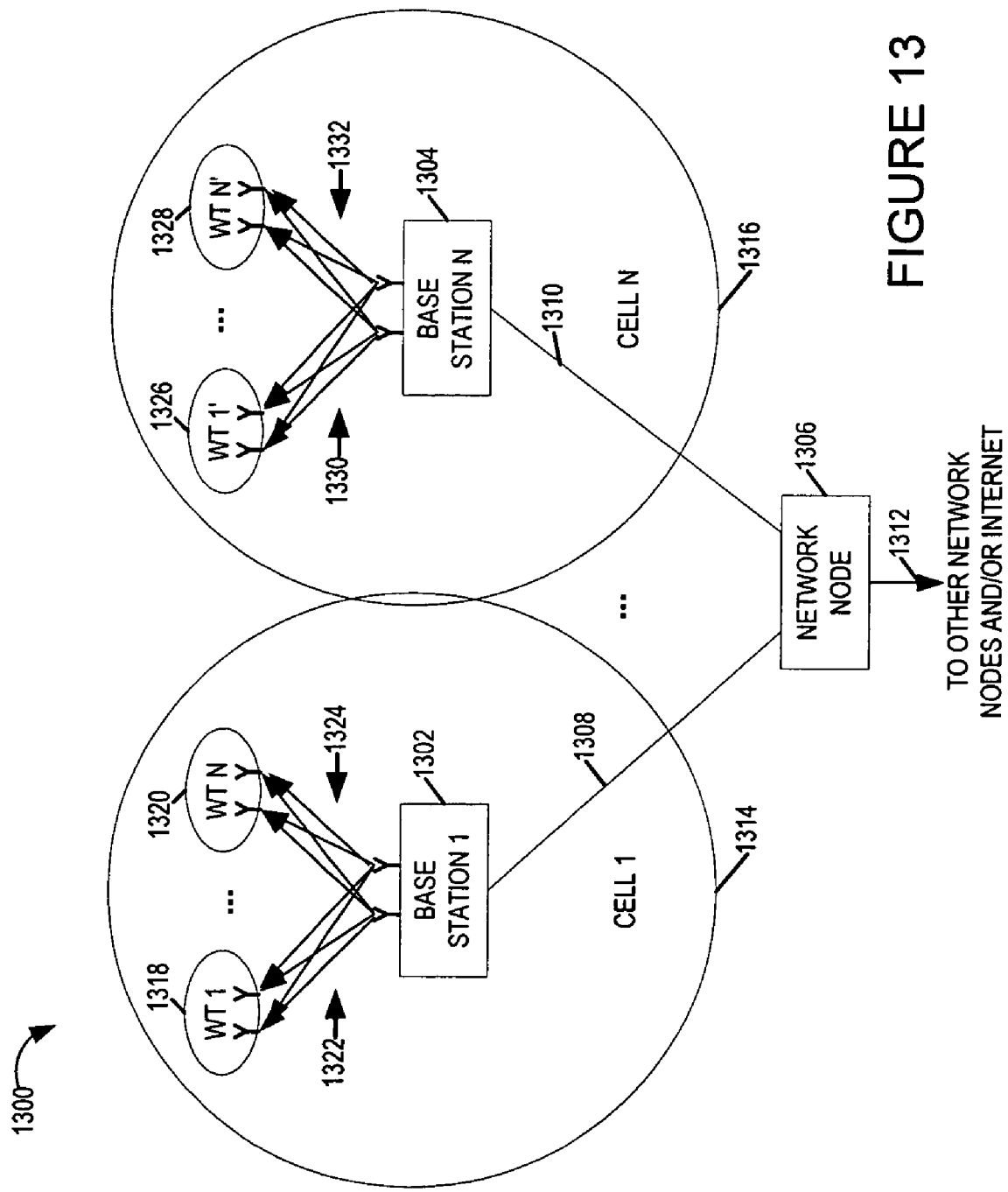
FIG. 13 is a drawing of an exemplary wireless communications system in accordance with various embodiments.

FIG. 13 is a drawing of an exemplary wireless communications system 1300 in accordance with various embodiments. Exemplary wireless communications system 1300 is, e.g., a downlink broadcast orthogonal frequency division multiplexing (OFDM) wireless communications system including base stations which use multiple transmit antenna elements and support superposition signaling in the downlink. Various novel implemented methods facilitate channel estimation.

Exemplary wireless communications system 1300 includes a plurality of base stations (base station 1 1302, . . . , base station N 1304), each base station has a corresponding wireless coverage area (cell 1 1314, . . . , cell N 1316), respectively. Multi-sector base stations are also used in some embodiments. The base station (1302, 1304) are coupled to a network node 1306, e.g., a router, via network links (1308, 1310), respectively. Network node 1306 is coupled to other network nodes, e.g., other routers, content provider nodes, base stations, AAA nodes, etc., and/or the Internet via network link 1312. Network links (1308, 1310, 1312) are, e.g., fiber optic links.

System 1300 also includes a plurality of wireless terminals. At least some of the wireless terminals are mobile nodes which can move through the system 1300. (WT 1 1318, . . . , WT N 1320) are currently coupled to base station 1 1302 via wireless downlink links (1322, . . . , 1324), respectively. (WT 1' 1326, . . . , WT N' 1328) are currently coupled to base station N 1304 via wireless downlink links (1330, . . . , 1332), respectively. As shown in FIG. 13, the WTs (1318, 1320, 1326, 1328) include multiple antenna elements and support communication with the base station using a MIMO antenna configuration. Various embodiments include base stations with multiple transmit antennas and wireless terminals with multiple receive antennas. Some embodiments include base stations with multiple transmit antennas and wireless terminals using a single receive antenna. Some embodiments include base stations with multiple transmit antennas and a mixture of wireless terminals with some having a single receive antenna and others having a plurality of receive antennas. Some embodiments include a standalone base station with multiple transmit antenna elements and a plurality of wireless terminals.

Figure 2:
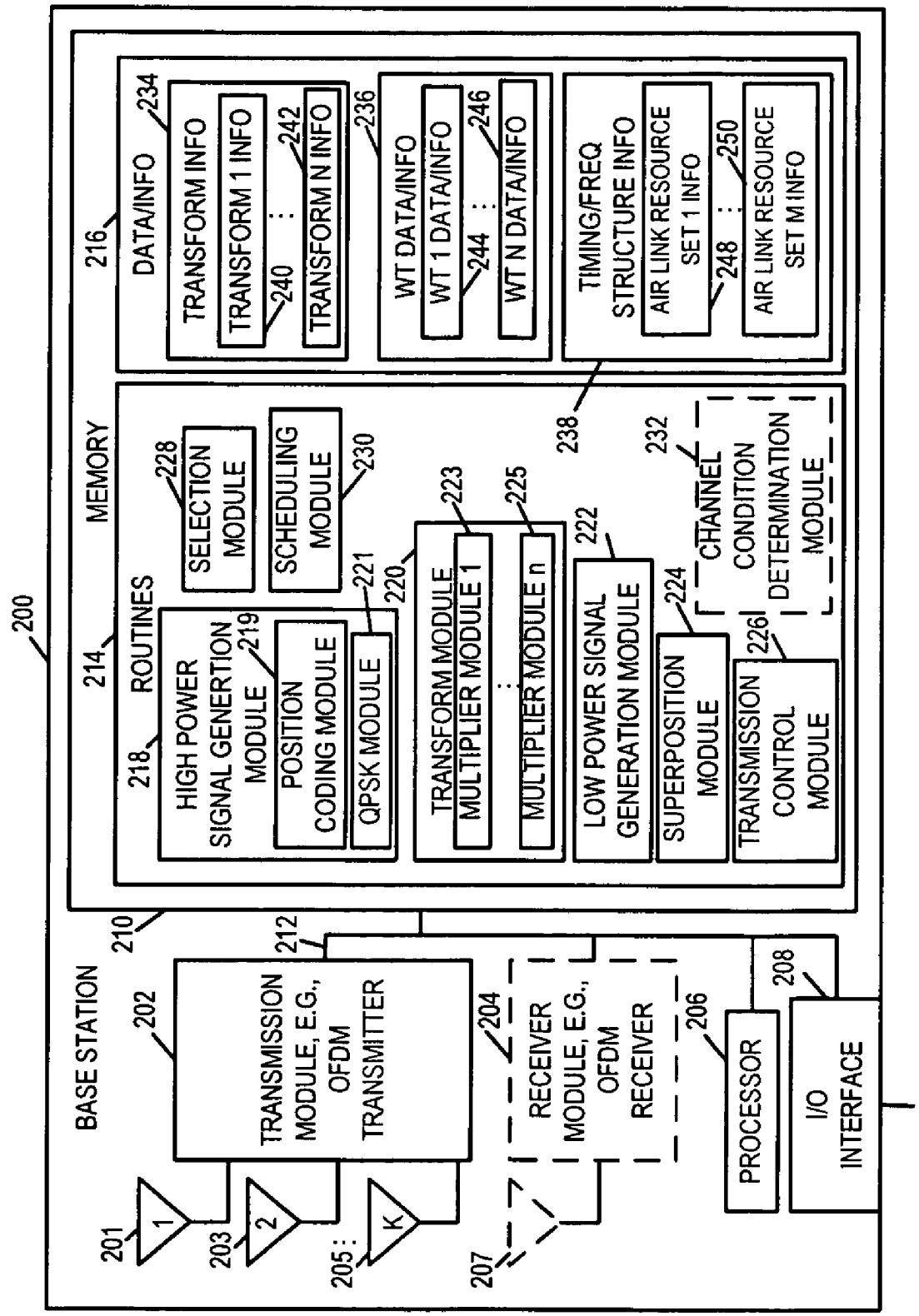
FIG. 2 is a drawing of an exemplary base station implemented in accordance with various embodiments.

FIG. 2 is a drawing of an exemplary base station 200 implemented in accordance with various embodiments. Base station 200 is, e.g., one of the base stations of system 100 of FIG. 1 or system 1300 of FIG. 13. Base station 200 is an example of one type of an access node. Exemplary base station 200 includes a plurality of transmit antenna elements and supports superposition downlink signaling. Exemplary base station 200 includes a transmission module 202, a processor 206, an I/O interface 208, and memory 210 coupled together via a bus 212 over which the various elements may interchange data and information. In some embodiments, e.g., some embodiments in which the base station also supports uplink signaling, the base station includes receiver module 204, which is also coupled to bus 212. In some embodiments, e.g., some embodiments in which the base station 200 broadcasts downlink signals to sets of users, the base station does not receive uplink signals from wireless terminals, and does not include receiver module 204.

Transmission module 202, e.g., an OFDM transmitter responsive to transmission control module 226, is coupled to a plurality of transmit antenna elements (transmit antenna element 1 201, transmit antenna element 2 203, . . . , transmit antenna element K 205), via which the base station 200 transmits downlink signals to wireless terminals. Transmission module 202 transmits downlink signals including superposed signals, e.g., a high power signal and a low power signal, using the same air link resource.

Receiver module 204, e.g., an OFDM receiver, is coupled to receive antenna 207 via which the base station 200 receives uplink signals from wireless terminals. Uplink signals include, e.g., feedback reports including channel condition information. In some embodiments base station 200 uses the same antenna or antennas for transmission and reception.

I/O interface 208 couples base station 200 to other networks nodes, e.g., other base stations, routers, AAA nodes, content server nodes, home agent nodes, etc., and/or the Internet. I/O interface 208 couples the base station 200 to a backhaul network allowing a wireless terminal using base station 200 as its point of network attachment to communicate with a peer node using a different base station as its point of network attachment.

Memory 210 includes routines 214 and data/information 216. The processor 206, e.g., a CPU, executes the routines 214 and uses the data/information 216 in memory 210 to control the operation of the base station 200 and implement methods.

Routines 214 include a high power signal generation module 218, a transform module 220, a low power signal generation module 222, a superposition module 224, a transmission control module 226, a selection module 228, and a scheduling module 230. In some embodiments, e.g., some embodiments including receiver module 204, routines 214 includes a channel condition determination module 232.

High power signal generation module 218 includes a position coding module 219 and a QPSK module 221. High power signal generation module 218 generates relatively high power signals to be transmitted, the generated signals using position encoding and QPSK modulation to convey information. Position coding module 219 encodes information via the designation of which air link resource units, e.g., tone-symbols, are to convey non-null QPSK modulation symbols and which air link resources, e.g., tone-symbols, are to convey null modulation symbols with respect to a generated high power signal and a set of air link resources, e.g., a set of tone-symbols. QPSK module 221 encodes information via the value(s) of the QPSK modulation symbols(s) which are non-null with respect to the generated high power signal and the set of air link resources, e.g., set of tone-symbols.

Transform module 220 includes a plurality of multiplier modules (multiplier module 1 233, . . . , multiplier module n 225). In other embodiments, the transform module 220 includes a single multiplier module which is time shared. Transform module 220 applies a predetermined transform to a signal to generate a transform result signal. For example, the transform module 220 applies a first predetermined transform to a first signal, e.g., a first high power signal, to generate a first transform result signal, the first transform result signal to be used to produce a combined signal which is transmitted. Continuing with the example, the transform module 220 also applies a second predetermined transform to a third signal, e.g., another high power signal, to generate a second transform result signal.

Transform module 220 produces different outputs for at least two different antenna elements included in said plurality of antenna elements. For example, a first transform result signal includes a first portion corresponding to a first antenna element and a second non-overlapping portion corresponding to a second antenna element.

Transform module 220, using one or more of multiplier modules (223, . . . , 225) multiplies a first signal by constants corresponding to different antenna elements, wherein at least two of the different constants corresponding to different antenna elements are different.

Thus, the first transform result signal includes a plurality of different portion corresponding to different antenna elements. Transform module 220, using one or more of multiplier modules (223, . . . , 225) also multiplies a third signal by constants corresponding to different antenna elements, wherein at least two of the different constants corresponding to different antenna elements are different to generate a second transform result signal. Thus, the second transform result signal includes a plurality of different portions corresponding to different antenna elements.

In various embodiments, the first predetermined transform is used by transform module 220 to generate the first transform result signal, and the second transform is used by transform module 220 to generate the second transform result signal, are linearly independent.

Low power signal generation module 222 generates a relatively low power signal to be transmitted. The generated low power signal can be, and sometimes is, superimposed with a high power transform result signal. The generated low power signal is, e.g., a conventional QAM signal, e.g., a QPSK, QAM 16, QAM 64, QAM 256 type signal, with a plurality of individual components or e.g., a conventional PSK signal, e.g., a 8 PSK signal with a plurality of individual components.

Superposition module 224 combines a transform result signal with another signal to produce a combined signal, the another signal having a lower power level than the transform result signal. For example, the superposition module 224 combines a first transform result signal, which is an output of the transform module 222 operating on a first high power signal, with a second signal which is low power signal, the second signal being an output of the low power signal generation module 222.

In some embodiments, the lower power level is a per transmission unit power level for non-null signal portions. For example, in some embodiments, a modulation symbol of a non-null transform result first signal designated to a particular OFDM tone-symbol slot has a higher power level than a modulation symbol of the second signal designated to be carried by the same OFDM tone-symbol slot using the same antenna element. As another example, in some embodiments, if a first average power level value is determined for the non-null components of the first transform result signal and a second average power level value is determined for the non-null components of the second signal, on a per transmission unit basis, the second value is lower than the first value. In some such embodiments, the difference is at least 3 dBs.

Transmission control module 226 controls transmission of different portions of a combined signal using different antenna elements on a set of time frequency resources. For example, a combined signal may include a non-overlapping portion corresponding to each of the different antenna elements. For example, consider that the air link resources used for transmitting a combined signal are a set of OFDM tone-symbols and consider that there are 3 transmit antenna elements being used to transmit the combined signal, the combined signal includes 3 non-overlapping portions, one non-overlapping portion associated with each antenna element Further consider that the set of OFDM tone-symbols is a set of 4 OFDM tone-symbols, then for each non-overlapping portion of the combined signal associated with an antenna element, there a 4 elements, one element to be transmitted per OFDM tone-symbol. In such a combined signal there are 12 elements.

Transmission control module 226 also controls transmission of different portions of the second transform result signal using different antenna elements on a second set of time and frequency resources, said second set of time and frequency resources being different from said set of time frequency resources used to transmit the combined signal including the first transform result signal. In some such embodiments, the first set of time frequency resources, associated with being used to carry the first transform result signal, is non-overlapping with the second set of time frequency resources, associated with being used to carry the second transform result signal.

Selection module 228 selects a transform to use, for a particular set of air link resources, from a plurality of different transforms. For example, corresponding to a first set of air link resources, the selection module 228 selects a first transform, e.g., transform 1 240, from the stored sets of transform information 234. Then, the transform module 220 uses the selected first transform to process the first high power signal, to generate a first transform result signal. The processing of the transform module 220 includes, in some embodiments, multiplication of high power signal elements by complex number constants. Continuing with the example, corresponding to a second set of air link resources, the first and second sets being non-overlapping, the selection module 228 selects a second transform, e.g., transform N 242 from the stored sets of transform information 234.

Scheduling module 230, in some embodiments, schedules users and/or sets of users to sets of air link resources, e.g., downlink and or uplink segments. Operations of scheduling module 230 include deciding which users are scheduled to receive high power signals and which users are scheduled to use receive low power signals with respect to superimposed downlink signals. Scheduling module 230, in some embodiments, schedules different types of information to be communicated on high power and low power signals.

Channel condition determination module 232 determines channel conditions corresponding to different wireless terminals using the base station as an attachment point. Channel condition determination module 232 processes feedback reports from the wireless terminals conveying channel condition information, e.g., SNR reports, SIR reports, noise reports, channel estimation vector information, etc. Results of the channel condition determination module 232 are used by the scheduling module 230 in deciding which wireless terminal are to receive high power signals and which are to receive low power signals.

Data/information 216 includes transform information 234, wireless terminal data/information 236 and timing/frequency structure information 238. Transform information 234 includes a plurality of different transforms (transform 1 information 240, . . . , transform N information 242). In various embodiments, some of the plurality of different transforms are linearly independent. In some embodiments, each of the plurality of different transforms are linearly independent. Transform 1 information 240 is, e.g., a predetermined set of complex constants defining a matrix. In some embodiments, the predetermined set of complex constants define different amount of phase shift to be applied.

In some embodiments, first and second transforms are used for generating first and second transform result signals to be transmitted in first and second symbol transmission time periods, respectively, said second symbol transmission time period immediately following said first symbol transmission time period.

WT data/information 236 includes a plurality of sets of data/information corresponding to different wireless terminals receiving information from the base station (WT 1 data/information 244, . . . , WT N data/information 246). Timing frequency structure information 238 includes information pertaining to a plurality of sets of air link resources used for downlink signaling (air link resource set 1 information 248, . . . , air link resource set M information 250). A set of air link resources is, e.g., a set of OFDM tone-symbols. The set of OFDM symbols is, e.g., a downlink segment or portion of a downlink segment, in which a combined signal is to be transmitted. The set of air link resources is used concurrently by different transmit antenna elements in communicating the combined signal.

In some embodiments, first and third signals, e.g., high power signals using position encoding, are directed to a first set of users and second and fourth signals, e.g., lower power signals using a conventional QAM scheme, are directed to second set of users which are a subset of a first set of users. In some such embodiments, the second set of users have better channel conditions than the first set of users. For example, the embodiment can be an embodiment where the first, second, third, and fourth signals are broadcast downlink signals.

Figure 3:
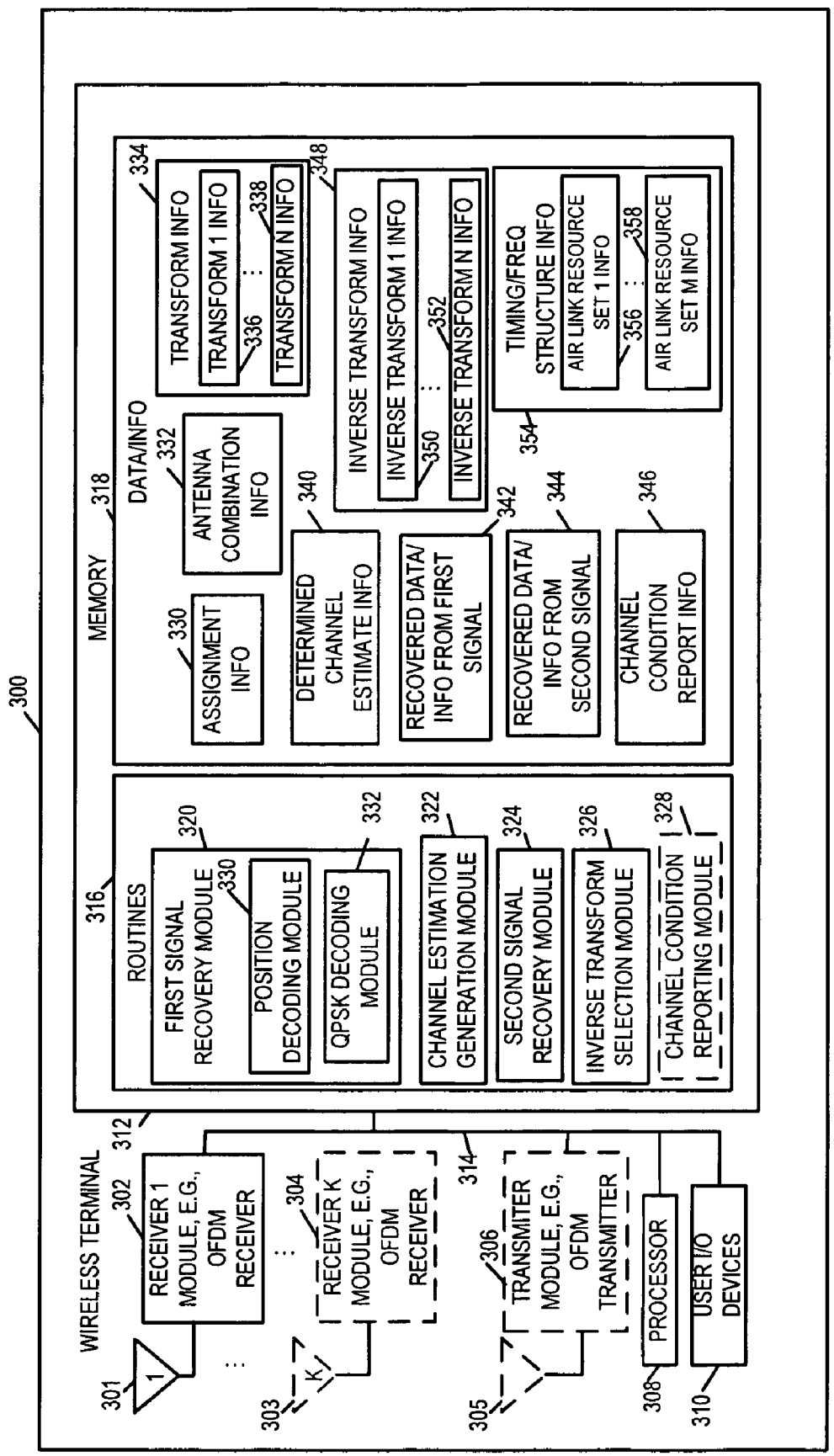
FIG. 3 is a drawing of an exemplary wireless terminal, e.g., mobile node, implemented in accordance with various embodiments.

FIG. 3 is a drawing of an exemplary wireless terminal 300, e.g., mobile node, implemented in accordance with various embodiments. Wireless terminal 300 is, e.g., one of the wireless terminals of system 100 of FIG. 1 or system 1300 of FIG. 13. Exemplary wireless terminal 300 includes a receiver module 302, a processor 308, user I/O devices 310, and memory 312 coupled together via a bus 314 over which the various elements may interchange data and information. In some embodiments, the wireless terminal 300 includes one or more additional receiver modules such as receiver K module 304. In some embodiments, the wireless terminal 300 includes a transmitter module 306 for transmitting uplink signals to a base station. In some other embodiments, the wireless terminal does not include a wireless transmitter module, and the wireless terminal functions to receive broadcast downlink signals, e.g., broadcast programs.

Receiver 1 module 302, e.g., an OFDM receiver, is coupled to receive antenna 1 301 via which the wireless terminal receives downlink signals, e.g., OFDM downlink signals, from a base station. At least some of the received downlink signals are superposed signals, and at least some of the received downlink signals have been transmitted by a base station using multiple transmit antenna elements concurrently using the same air link resources to send signals to wireless terminal 300. For example, a superposed signal including a high power signal and a low power signal is transmitted by base station 200 using multiple transmit antenna elements and the same air link resources, and one of the high and low power signals is intended to communicate data to the wireless terminal. Advantageously, the base station 200 uses different transforms for different set of air link resources with regard to generating high power signals, and this facilitates channel estimation by wireless terminal 300 regardless of whether the high or low power signal of the superimposed signal is communicating data to specific wireless terminal 300.

Receiver 1 module 302 thus receives first and second signals on the same set of time frequency resources, e.g., a set of OFDM tone-symbols comprising a downlink segment or a portion of downlink segment. Receiver 1 module 302 also receives an additional first signal on an additional set of time and frequency resources.

Receiver K module 304, e.g., an additional OFDM receiver, is coupled to antenna K 303 via which the wireless terminal receives downlink signals from a base station. Wireless terminal 300, when implemented with a plurality of receiver modules and receiver antennas, can, and sometimes does, function in a MIMO antenna communications mode, e.g., in cooperation with base station 200.

Transmitter module 306, e.g., an OFDM transmitter, is coupled to transmit antenna 305 via which the wireless terminal 300 transmits uplink signals to base stations. Uplink signals include channel condition reports, e.g., feedback reports of SNR and/or SIR, noise reports, channel estimation reports, etc. In some embodiments, the same antenna or antennas are used by wireless terminal 300 for receiving and transmitting.

User I/O devices 310 include, e.g., microphone, speaker, keyboard, keypad, switches, camera, display, etc. User I/O devices 310 allow an operator to input user data/information, access output data/information, and/or control at least some functions of the wireless terminal 300, e.g., initiate a communication session, select a broadcast program, etc.

Memory 312 includes routines 316 and data/information 318. The processor 308, e.g., a CPU, executes the routines 316 and uses the data/information 318 in memory 312 to control the operation of the wireless terminal 300 and implement methods. Routines 316 include a first signal recovery module 320, a channel estimation generation module 322, a second signal recovery module 324, and an inverse transform selection module 326. In some embodiments routines 316 include a channel condition reporting module 328.

First signal recovery 320 module decodes a received first signal, e.g., a relatively high power signal using position encoding and QPSK modulation to communicate information. First signal recovery module 320 includes a position decoding module 330 and a QPSK decoding module 332. The position decoding module 330 identifies the position of high power modulation symbols of the first signal in the set of time frequency resources used to transmit the first signal and recovers information conveyed by the position of the identified high power modulation symbols of the first signal. QPSK decoding module 332 recovers information conveyed by the high power QPSK modulation symbols of the first signal.

First signal recovery module 320 uses a first inverse transform to process said first received signal and uses a second inverse transform to process said additional first received signal, said first and second inverse transforms being different.

In some embodiments, the first signal recovery module 320 uses the stored antenna combination information 332 to decode the received first signal. In various embodiments, decoding of the first signal is performed using a first channel estimate and the generated channel estimate from the channel estimation generation module 322 is a second channel estimate, e.g., an improved estimate of the same channel to which the first channel estimate corresponds.

Channel estimation generation module 322 generates a channel estimate using the first signal. In some embodiments, channel estimation generation module 322 uses said additional first signal in addition to said first signal in generating a channel estimate.

In some embodiments, in which the wireless terminal includes a plurality of receivers, the channel estimation module 322 generates different channel estimates for each of said plurality of receivers.

In some embodiments, channel estimation generation module 332 generates an independent channel estimate corresponding to said first signal and an independent channel estimate corresponding to said first additional signal.

Second signal recovery module 324 performs a decoding operation on a second signal, e.g., a low power signal superposed with the first signal, using a generated channel estimate obtained from the channel estimation generation module 322.

Inverse transform selection module 326 selects an inverse transform to be used by the first signal recovery module 320 corresponding to a set of air link resources, e.g., corresponding to a downlink segment or portion of a downlink segment. For example, corresponding to a first set of air link resources, e.g., segment 1, the wireless terminal selects to use inverse transform 1 350 because the wireless terminal is aware that the base station is using transform 1 336, when generating the output signal corresponding to received first signal. Continuing with the example, corresponding to a second set of air link resources, e.g., segment 2, the wireless terminal selects to use inverse transform N 352 because the wireless terminal is aware that the base station is using transform N 338, when generating the output signal corresponding to received first signal.

Channel condition reporting module 328 generates a channel condition feedback report, e.g., an SNR report, a SIR report, a noise report, a channel estimation vector report, etc., which is transmitted via transmitter module 306 through transmit antenna 305 to the base station. The base station uses the channel condition reporting information to schedule users, e.g., deciding whether a user should be sent data/information information using a first signal, e.g., a high power signal or a second signal, e.g., a low power signal.

Data/information 318 includes assignment information 330, antenna combination information 332, transform information 334, determined channel estimate information 340, recovered data/information from first signal 342, recovered data/information from second signal 344, inverse transform information 348 and timing/frequency structure information 354. In some embodiments data/information 318 includes channel condition report information 346.

Assignment information 330, in some embodiments, includes information identifying air link resources and/or signal type assigned to wireless terminal 300. Assignment information 330, in some embodiments, e.g., an embodiment where WT 300 is a broadcast receiver, includes information identifying program and/or channel associated with sets of air link resources and/or signal type information.

Stored antenna combination information 332 provides information on different antenna combinations used to transmit information to the wireless terminal 300. In some embodiments, the first signal recovery module 320 uses the stored antenna combination information 332 to decode the first signal.

Transform information 334 includes a plurality of sets of transform information (transform 1 information 336, . . . , transform N information 338). Transform information 334 includes information indicating different transforms for different transmitter antenna combinations. Inverse transform information 348 includes a plurality of sets of inverse transform information (inverse transform 1 information 350, . . . , inverse transform N information 352). Timing/frequency structure information 354 includes a plurality of sets of timing/frequency structure information ( air link resource set 1 information 356, . . . , air link resource set M information 358). A set of air link resources is, e.g., a set of OFDM tone-symbols. The set of OFDM symbols is, e.g., a downlink segment or portion of a downlink segment. The set of air link resources is used concurrently by different transmit antenna elements of a base station in communicating a combined signal.

Determined channel estimate information 340 is an output of channel estimation generation module 322, while channel condition report information 346 is an output of channel condition reporting module 328. Recovered data information from first signal 342 is an output of first signal recovery module 320, while recovered data/information from second signal 344 is an output of second signal recovery module 324.

Figure 4:
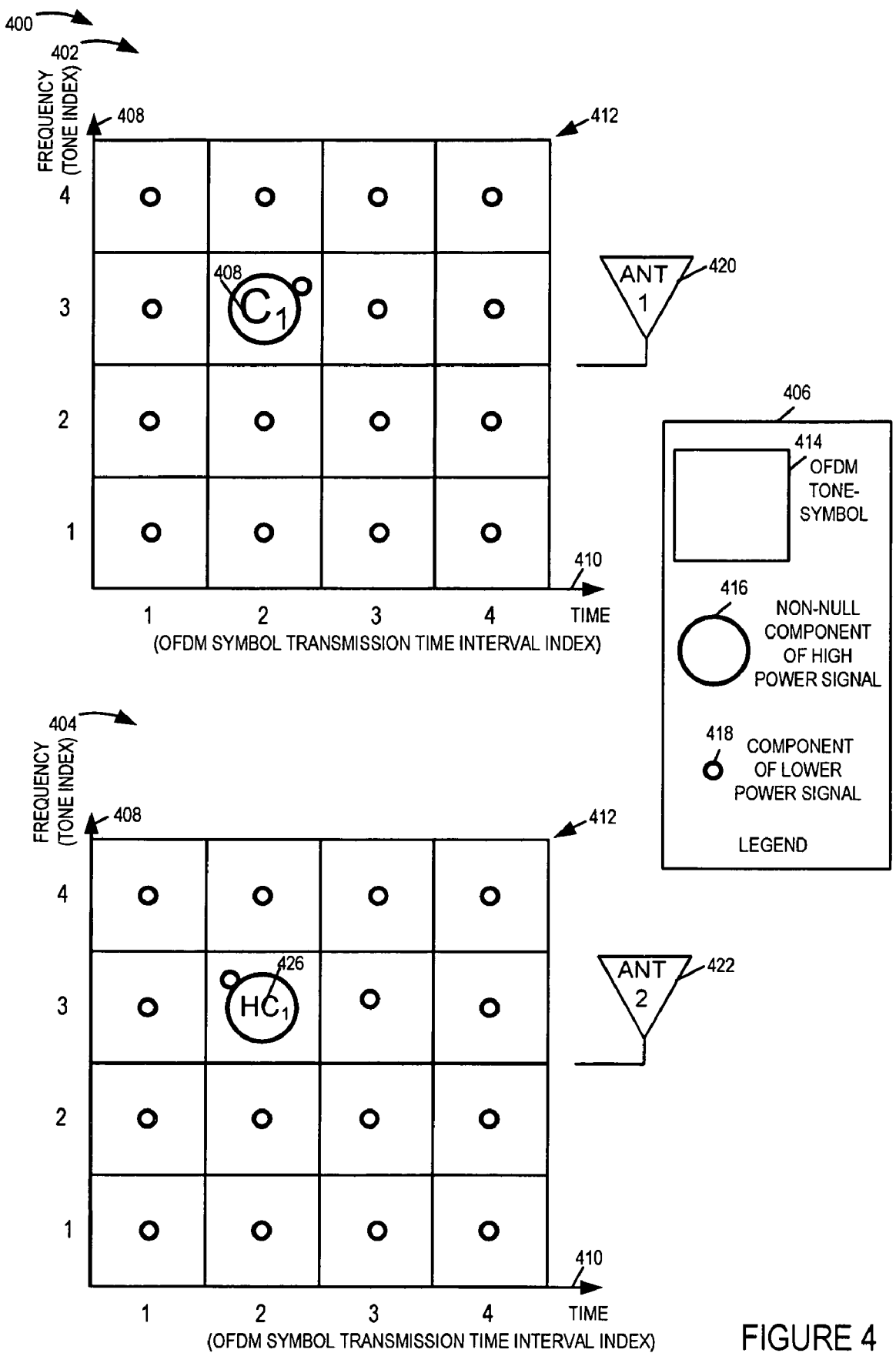
FIG. 4 is a drawing illustrating exemplary superposition signaling utilizing multiple antennas in accordance with various embodiments.

FIG. 4 is a drawing 400 illustrating exemplary superposition signaling utilizing multiple antennas in accordance with various embodiments. Drawing 400 includes an upper drawing portion 402, a lower drawing portion 404, and a legend 406. Legend 406 indicates that a square grid box 414 represents a basic unit of air link resources, an OFDM tone-symbol. Legend 406 also indicates that a large circle 416 represents a non-null component of a first signal, the first signal being a high power signal, and that a small circle 418 represents a component of a second signal, the second signal being a lower power signal.

Air link time/frequency resource 412 includes 16 OFDM tone-symbols. Upper drawing portion 402 represents signal transmitted over antenna 1 420, while lower drawing portion 404 represents signal transmitted over antenna 2 422. Air link resource 412 is the same corresponding to the two antennas 420 and 422. Horizontal axis 410 represent time, e.g., OFDM symbol transmission time interval index, while vertical axis 408 represents frequency, e.g., tone index.

The first signal, which is the high power signal, is a signal comprising high power non-null component and some null components, with some information being encoded in the position of the high power non-null component and some information being encoded in the value of the modulation symbol being carried by the non-null component, e.g., a QPSK modulation symbol.

The position of the non-null component of the high power signal within the resource 412 is intentionally the same with respect to both antennas. In this example, the tone-symbol with frequency index=3 and OFDM symbol transmission time index=2 happens to carry the high power non-null component of the first signal. The value of the high power signal component $H \cdot C_1$ 424 transmitted using antenna 2 422 is a transform of the value of the high power signal component $C_1$ transmitted using antenna 1 420.

The first signal can serve as a reference, and can be, and sometimes is, used to carry information for a user, e.g., a far away user with poor SNR. The first user can pick off the high power signal and decode it recovering the conveyed information.

The second signal, which is the low power signal, can be directed to another user, e.g., a close user with high SNR. The second user can pick off the high power signal, process the received high power signal, and use the high power signal information to estimate channel conditions and/or further refine a channel estimation. Thus from the perspective of the second user, the non-null components of the first signal can be used as pilots. The estimated channel conditions are utilized in processing the received second signal components, e.g., QAM modulation symbol signals such as QAM 256 modulation symbol signals, and recovering second signal information being conveyed.

Figure 5:
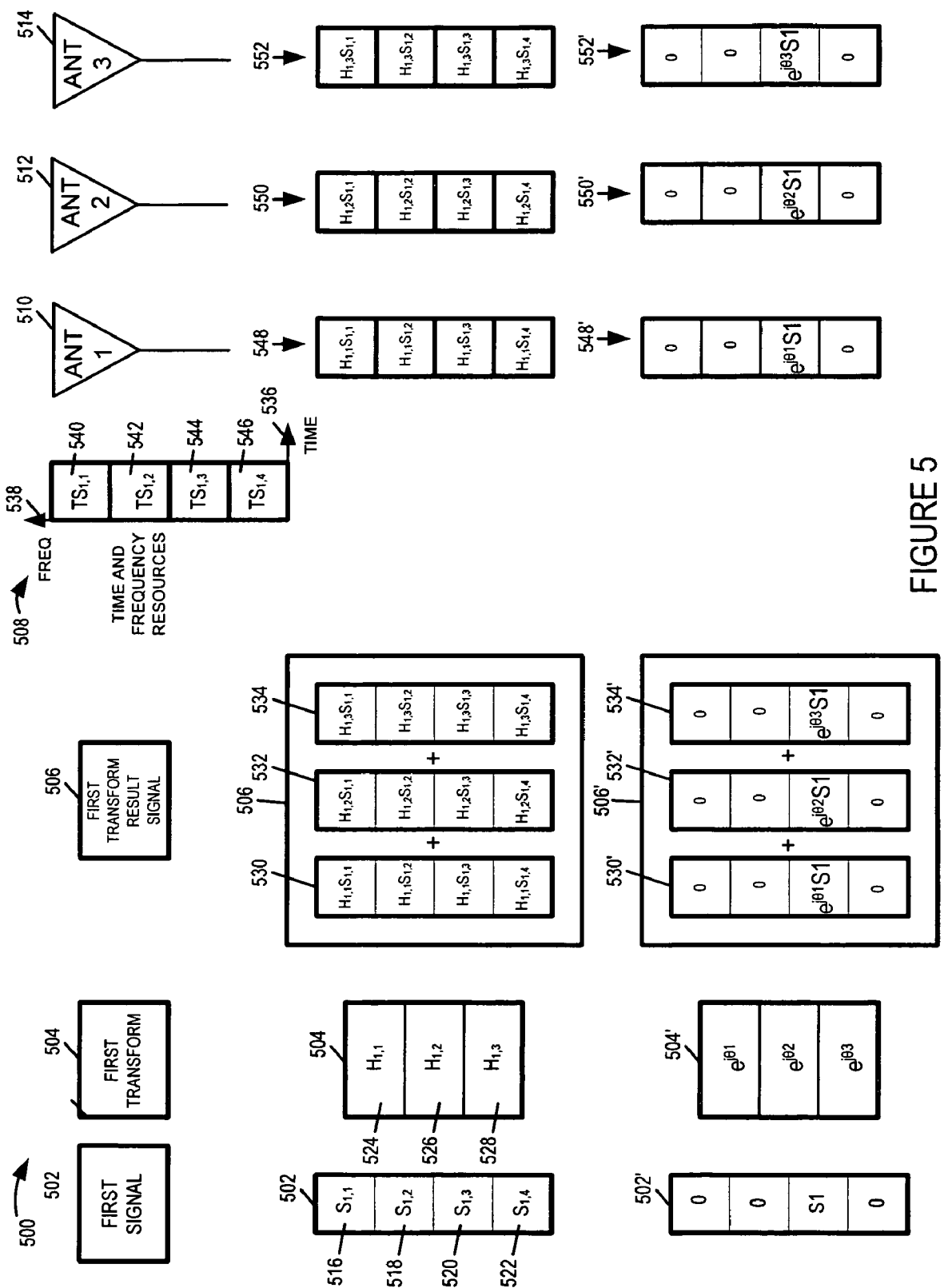
FIG. 5 is a drawing illustrating exemplary signal transform and signaling utilizing multiple antennas in accordance with various embodiments.

FIG. 5 is a drawing 500 illustrating exemplary signal transform and signaling utilizing multiple antennas in accordance with various embodiments. FIG. 5 includes a first signal 502, a first transform 504, a first transform result signal 506, an air link resources graph 508, a first antenna 510, a second antenna 512 and a third antenna 514. The first signal 502 includes four elements ($S_{1,1}$ 516, $S_{1,2}$ 518, $S_{1,3}$ 520, $S_{1,4}$ 522). The first transform 504 includes 3 elements ($H_{1,1}$ 524, $H_{1,2}$ 526, $H_{1,3}$ 528). The first transform result signal 506, which is a result of a multiplication of the first signal 502 with the first transform 504, includes 12 components, which are grouped into 3 sets of 4 components (530, 532, 534). The air link resource graph 508 plots time on the horizontal axis 536 vs. frequency on the vertical axis 538. In this example, the basic unit of air link resources is a tone-symbol representing one tone for the duration of one OFDM symbol transmission time interval. The same air link resources of four tone-symbols ($TS_{1,1}$ 540, $TS_{1,2}$ 542, $TS_{1,3}$ 544, $TS_{1,4}$ 546) are used by the antennas (antenna 1 510, antenna 2 512, antenna 3 514) to transmit portions of the first transform result signal.

Block 548 indicates that first portion 530 of first transform result signal 506 is transmitted over antenna 1 510 using OFDM tone-symbols (540, 542, 544, 546). Block 550 indicates that second portion 532 of first transform result signal 506 is transmitted over antenna 2 512 using OFDM tone-symbols (540, 542, 544, 546). Block 552 indicates that third portion 534 of first transform result signal 506 is transmitted over antenna 3 514 using OFDM tone-symbols (540, 542, 544, 546).

A more specific example shall now be described. Consider that the first signal is a signal using position encoding to convey information. For example, one of the first elements of the first signal is non-zero and the other three elements are zero, and the position of the non-zero element conveys information. Block 502' represents such an exemplary first signal. Exemplary first transform 504' includes three elements, each representing a different amount of phase shift, ($e^{j\Theta_1}$, $e^{j\Theta_2}$, $e^{j\Theta_3}$). First transform result signal 506' includes a first portion 530', a second portion 532' and a third portion 534'.

Block 548' indicates that first portion 530' of first transform result signal 506' is transmitted over antenna 1 510 using OFDM tone-symbols (540, 542, 544, 546). Block 550' indicates that second portion 532' of first transform result signal 506' is transmitted over antenna 2 512 using OFDM tone-symbols (540, 542, 544, 546). Block 552' indicates that third portion 534' of first transform result signal 506' is transmitted over antenna 3 514 using OFDM tone-symbols (540, 542, 544, 546).

Figure 6:
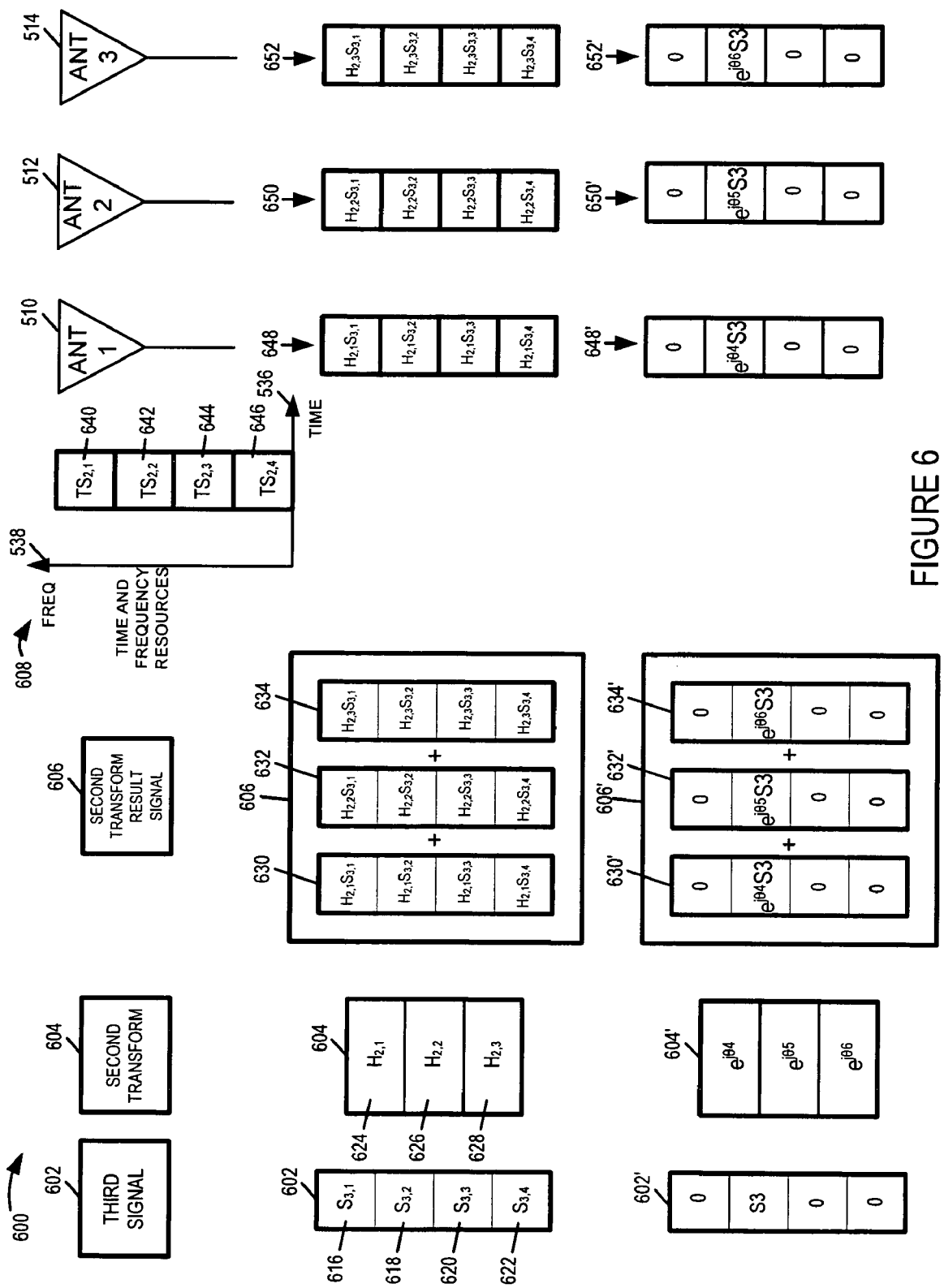
FIG. 6 is a drawing illustrating exemplary signal transform and signaling utilizing multiple antennas in accordance with various embodiments.

FIG. 6 is a drawing 600 illustrating exemplary signal transform and signaling utilizing multiple antennas in accordance with various embodiments. FIG. 6 includes a third signal 602, a second transform 604, a second transform result signal 606, an air link resources graph 608, a first antenna 510, a second antenna 512 and a third antenna 514. The third signal 602 includes four elements ($S_{3,1}$ 616, $S_{3,2}$ 618, $S_{3,3}$ 620, $S_{3,4}$ 622). The second transform 604 includes 3 elements ($H_{2,1}$ 624, $H_{2,2}$ 626, $H_{2,3}$ 628). The second transform result signal 606, which is a result of a multiplication of the third signal 602 with the second transform 604, includes 12 components, which are grouped into 3 sets of 4 components (630, 632, 634). The air link resource graph 608 plots time on the horizontal axis 536 vs. frequency on the vertical axis 538. In this example, the basic unit of air link resources is a tone-symbol representing one tone for the duration of one OFDM symbol transmission time interval. The same air link resources of four tone-symbols ($TS_{2,1}$ 640, $TS_{2,2}$ 642, $TS_{2,3}$ 644, $TS_{2,4}$ 646) are used by the antennas (antenna 1 510, antenna 2 512, antenna 3 514) to transmit portions of the second transform result signal.

Block 648 indicates that first portion 630 of second transform result signal 606 is transmitted over antenna 1 510 using OFDM tone-symbols (640, 642, 644, 646). Block 650 indicates that second portion 632 of second transform result signal 606 is transmitted over antenna 2 512 using OFDM tone-symbols (640, 642, 644, 646). Block 652 indicates that third portion 634 of second transform result signal 606 is transmitted over antenna 3 514 using OFDM tone-symbols (640, 642, 644, 646).

A more specific example shall now be described. Consider that the third signal is a signal using position encoding to convey information. For example, one of the first elements of the first signal is non-zero and the other three elements are zero, and the position of the non-zero element conveys information. Block 602' represents such an exemplary third signal. Exemplary second transform 604' includes three elements, each representing a different amount of phase shift, ($e^{j\Theta 4}$, $e^{j\Theta 5}$, $e^{j\Theta 6}$). Second transform result signal 606' includes a first portion 630', a second portion 632' and a third portion 634'.

Block 648' indicates that first portion 630' of second transform result signal 606' is transmitted over antenna 1 510 using OFDM tone-symbols (640, 642, 644, 646). Block 650' indicates that second portion 632' of second transform result signal 606' is transmitted over antenna 2 512 using OFDM tone-symbols (640, 642, 644, 646). Block 652' indicates that third portion 634' of second transform result signal 606' is transmitted over antenna 3 514 using OFDM tone-symbols (640, 642, 644, 646).

Figure 7:
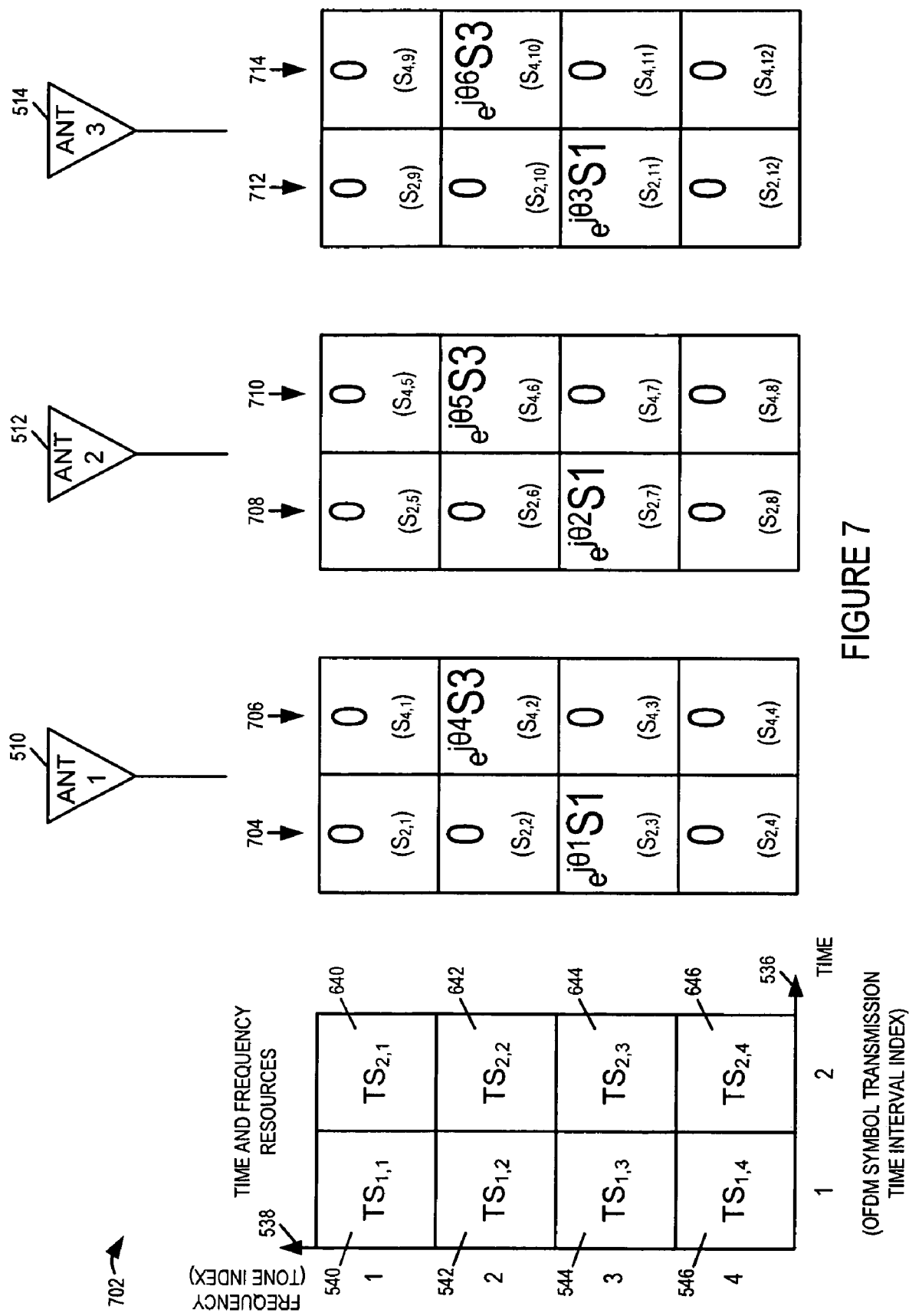
FIG. 7 illustrates exemplary superposition signaling utilizing multiple antennas.

FIG. 7 illustrates exemplary superposition signaling utilizing multiple antennas. FIG. 7 illustrates a composite of air link resources and transmitted signals represented in FIG. 5 and FIG. 6. FIG. 7 includes the addition of an exemplary second signal which is superimposed on the first transform result signal. Exemplary second signal includes components ($S_{2,1}$, $S_{2,2}$, $S_{2,3}$, $S_{2,4}$, $S_{2,5}$, $S_{2,6}$, $S_{2,7}$, $S_{2,8}$, $S_{2,9}$, $S_{2,10}$, $S_{2,11}$, $S_{2,12}$). FIG. 7 also includes the addition of an exemplary fourth signal which is superimposed on the second transform result signal. Exemplary fourth signal includes components ($S_{4,1}$, $S_{4,2}$, $S_{4,3}$, $S_{4,4}$, $S_{4,5}$, $S_{4,6}$, $S_{4,7}$, $S_{4,8}$, $S_{4,9}$, $S_{4,10}$, $S_{4,11}$, $S_{4,12}$).

The first transform result signal is a high power signal, while the second signal is a low power signal. The second transform result signal is a high power signal, while the fourth signal is a low power signal.

The air link resource graph 702 plots time on the horizontal axis 536 vs frequency on the vertical axis 538. The same air link resources of eight tone-symbols ($TS_{1,1}$ 540, $TS_{1,2}$ 542, $TS_{1,3}$ 544, $TS_{1,4}$ 546, $TS_{2,1}$ 640, $TS_{2,2}$ 642, $TS_{2,3}$ 644, $TS_{2,4}$ 646) are used by the antennas (antenna 1 510, antenna 2 512, antenna 3 514) to transmit signals. Column 704 illustrates signal transmitted by antenna 1 510, during a first OFDM symbol transmission time interval, using tone-symbols (540, 542, 544, 546), which represents the superposition of a portion of a first transform result signal (0, 0, $e^{j\Theta 1}$ S1, 0), with components ($S_{2,1}$, $S_{2,2}$, $S_{2,3}$, $S_{2,4}$) of the second signal, respectively. Column 706 illustrates signal transmitted by antenna 1 510, during a second OFDM symbol transmission time interval, using tone-symbols (640, 642, 644, 646), which represents the superposition of a portion of a second transform result signal (0, $e^{j\Theta 4}$S3, 0, 0), with components ($S_{4,1}$, $S_{4,2}$, $S_{4,3}$, $S_{4,4}$) of the fourth signal, respectively.

Column 708 illustrates signal transmitted by antenna 2 512, during a first OFDM symbol transmission time interval, using tone-symbols (540, 542, 544, 546), which represents the superposition of a portion of a first transform result signal (0, 0, $e^{j\Theta 2}$S1, 0), with components ($S_{2,5}$, $S_{2,6}$, $S_{2,7}$, $S_{2,8}$) of the second signal, respectively. Column 710 illustrates signal transmitted by antenna 2 512, during a second OFDM symbol transmission time interval, using tone-symbols (640, 642, 644, 646), which represents the superposition of a portion of a second transform result signal (0, $e^{j\Theta 5}$S3, 0, 0), with components ($S_{4,5}$, $S_{4,6}$, $S_{4,7}$, $S_{4,8}$) of the fourth signal, respectively.

Column 712 illustrates signal transmitted by antenna 3 514, during a first OFDM symbol transmission time interval, using tone-symbols (540, 542, 544, 546), which represents the superposition of a portion of a first transform result signal (0, 0, $e^{j\Theta 3}$S1, 0), with components ($S_{2,9}$, $S_{2,10}$, $S_{2,11}$, $S_{2,12}$) of the second signal, respectively. Column 714 illustrates signal transmitted by antenna 3 514, during a second OFDM symbol transmission time interval, using tone-symbols (640, 642, 644, 646), which represents the superposition of a portion of a second transform result signal (0, $e^{j\Theta 6}$S3, 0, 0), with components ($S_{4,9}$, $S_{4,10}$, $S_{4,11}$, $S_{4,12}$) of the fourth signal, respectively.

Although illustrated in FIGS. 5, 6, and 7 for exemplary embodiments using three antennas, various other embodiments include two antennas or more than three antennas. In addition, in different embodiments, the amount of resources, e.g., number of tone-symbols used to carry the first transform result signal is a predetermined number which is different from four, e.g., two, eight, sixteen.

Figure 8:
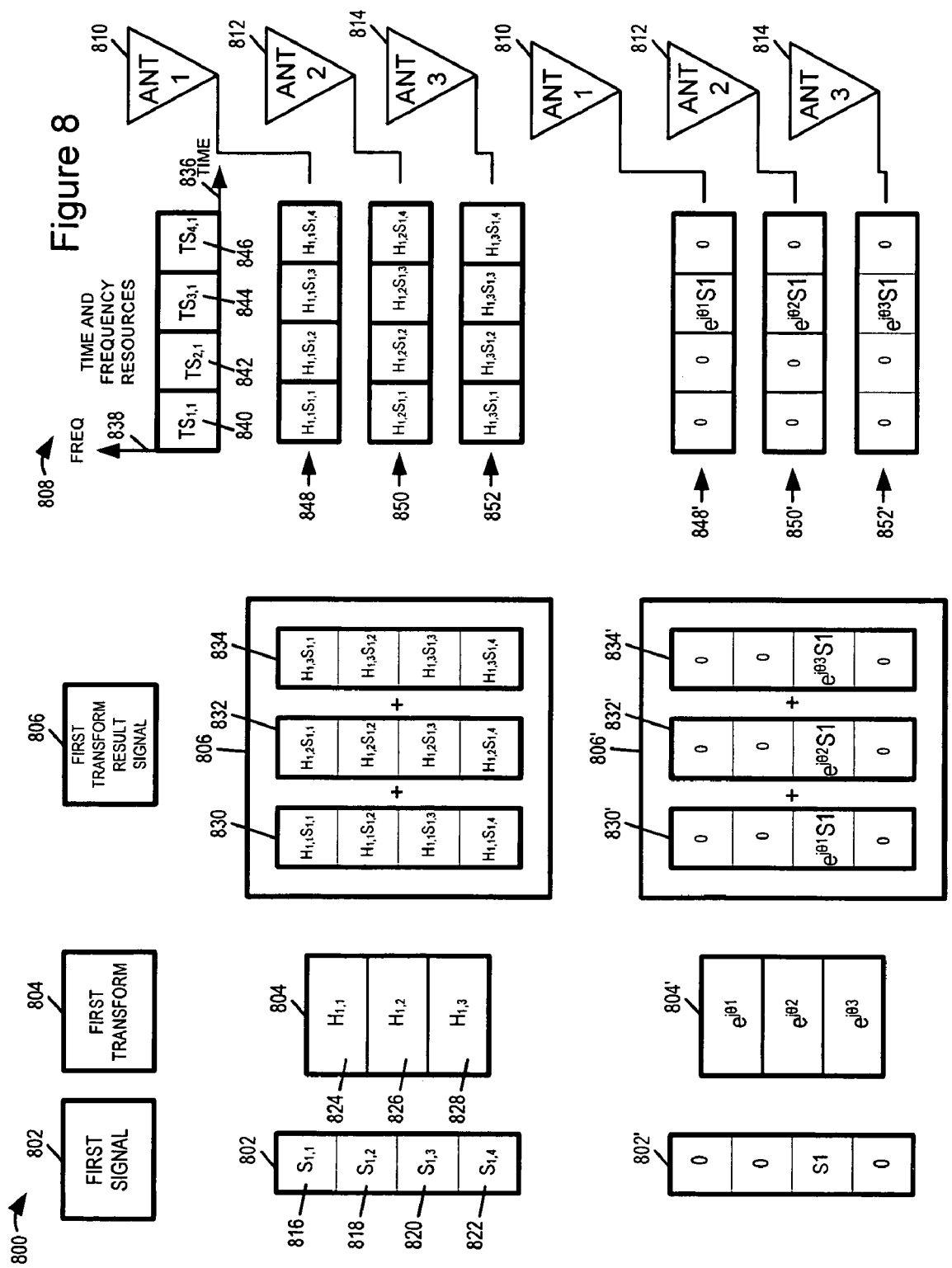
FIG. 8 is a drawing illustrating exemplary signal transform and signaling utilizing multiple antennas in accordance with various embodiments.

FIG. 8 is a drawing 800 illustrating exemplary signal transform and signaling utilizing multiple antennas in accordance with various embodiments. FIG. 8 includes a first signal 802, a first transform 804, a first transform result signal 806, an air link resources graph 808, a first antenna 810, a second antenna 812 and a third antenna 814. The first signal 802 includes four elements ($S_{1,1}$ 816, $S_{1,2}$ 818, $S_{1,3}$ 820, $S_{1,4}$ 822). The first transform 804 includes 3 elements ($H_{1,1}$ 824, $H_{1,2}$ 826, $H_{1,3}$ 828). The first transform result signal 806, which is a result of a multiplication of the first signal 802 with the first transform 804, includes 12 components, which are grouped into 3 sets of 4 components (830, 832, 834). The air link resource graph 808 plots time on the horizontal axis 836 vs frequency on the vertical axis 838. In this example, the basic unit of air link resources is a tone-symbol representing one tone for the duration of one OFDM symbol transmission time interval. The same air link resources of four tone-symbols ($TS_{1,1}$ 840, $TS_{2,1}$ 842, $TS_{3,1}$ 844, $TS_{4,1}$ 846) are used by the antennas (antenna 1 810, antenna 2 812, antenna 3 814) to transmit portions of the first transform result signal.

Block 848 indicates that first portion 830 of first transform result signal 806 is transmitted over antenna 1 810 using OFDM tone-symbols (840, 842, 844, 846). Block 850 indicates that second portion 832 of first transform result signal 806 is transmitted over antenna 2 812 using OFDM tone-symbols (840, 842, 844, 846). Block 852 indicates that third portion 834 of first transform result signal 806 is transmitted over antenna 3 814 using OFDM tone-symbols (840, 842, 844, 846).

A more specific example shall now be described. Consider that the first signal is a signal using position encoding to convey information. For example, one of the first elements of the first signal is non-zero and the other three elements are zero, and the position of the non-zero element conveys information. Block 802' represents such an exemplary first signal. Exemplary first transform 804' includes three elements, each representing a different amount of phase shift, ($e^{j\Theta 1}$, $e^{j\Theta 2}$, $e^{j\Theta 3}$). First transform result signal 806' includes a first portion 830', a second portion 832' and a third portion 834'.

Block 848' indicates that first portion 830' of first transform result signal 806' is transmitted over antenna 1 810 using OFDM tone-symbols (840, 842, 844, 846). Block 850' indicates that second portion 832' of first transform result signal 806' is transmitted over antenna 2 812 using OFDM tone-symbols (840, 842, 844, 846). Block 852' indicates that third portion 834' of first transform result signal 806' is transmitted over antenna 3 814 using OFDM tone-symbols (840, 842, 844, 846).

Figure 9:
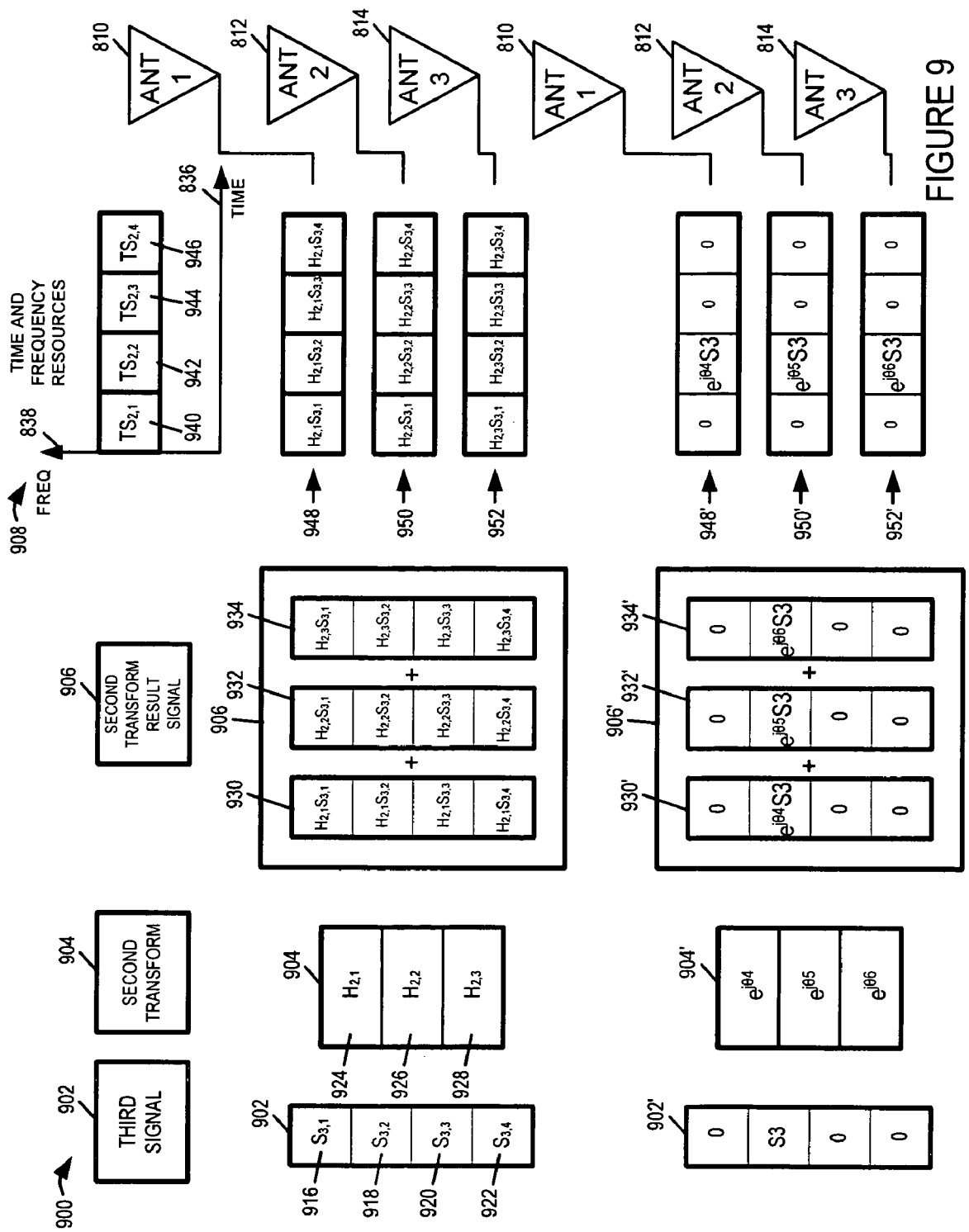
FIG. 9 is a drawing illustrating exemplary signal transform and signaling utilizing multiple antennas in accordance with various embodiments.

FIG. 9 is a drawing 900 illustrating exemplary signal transform and signaling utilizing multiple antennas in accordance with various embodiments. FIG. 9 includes a third signal 902, a second transform 904, a second transform result signal 906, an air link resources graph 908, a first antenna 810, a second antenna 812 and a third antenna 814. The third signal 902 includes four elements ($S_{3,1}$ 916, $S_{3,2}$ 918, $S_{3,3}$ 920, $S_{3,4}$ 922). The second transform 904 includes 3 elements ($H_{2,1}$ 924, $H_{2,2}$ 926, $H_{2,3}$ 928). The second transform result signal 906, which is a result of a multiplication of the third signal 902 with the second transform 904, includes 12 components, which are grouped into 3 sets of 4 components (930, 932, 934). The air link resource graph 908 plots time on the horizontal axis 836 vs frequency on the vertical axis 838. In this example, the basic unit of air link resources is a tone-symbol representing one tone for the duration of one OFDM symbol transmission time interval. The same air link resources of four tone-symbols ($TS_{2,1}$ 940, $TS_{2,2}$ 942, $TS_{2,3}$ 944, $TS_{2,4}$ 946) are used by the antennas (antenna 1 810, antenna 2 812, antenna 3 814) to transmit portions of the second transform result signal.

Block 948 indicates that first portion 930 of second transform result signal 906 is transmitted over antenna 1 810 using OFDM tone-symbols (940, 942, 944, 946). Block 950 indicates that second portion 932 of second transform result signal 906 is transmitted over antenna 2 812 using OFDM tone-symbols (940, 942, 944, 946). Block 952 indicates that third portion 934 of second transform result signal 906 is transmitted over antenna 3 814 using OFDM tone-symbols (940, 942, 944, 946).

A more specific example shall now be described. Consider that the third signal is a signal using position encoding to convey information. For example, one of the first elements of the first signal is non-zero and the other three elements are zero, and the position of the non-zero element conveys information. Block 902' represents such an exemplary third signal. Exemplary second transform 904' includes three elements, each representing a different amount of phase shift, ($e^{j\theta 4}$, $e^{j\theta 5}$, $e^{j\theta 6}$). Second transform result signal 906' includes a first portion 930', a second portion 932' and a third portion 934'.

Block 948' indicates that first portion 930' of first transform result signal 906' is transmitted over antenna 1 810 using OFDM tone-symbols (940, 942, 944, 946). Block 950' indicates that second portion 932' of second transform result signal 906' is transmitted over antenna 2 812 using OFDM tone-symbols (940, 942, 944, 946). Block 952' indicates that third portion 934' of second transform result signal 906' is transmitted over antenna 3 814 using OFDM tone-symbols (940, 942, 944, 946).

Figure 10:
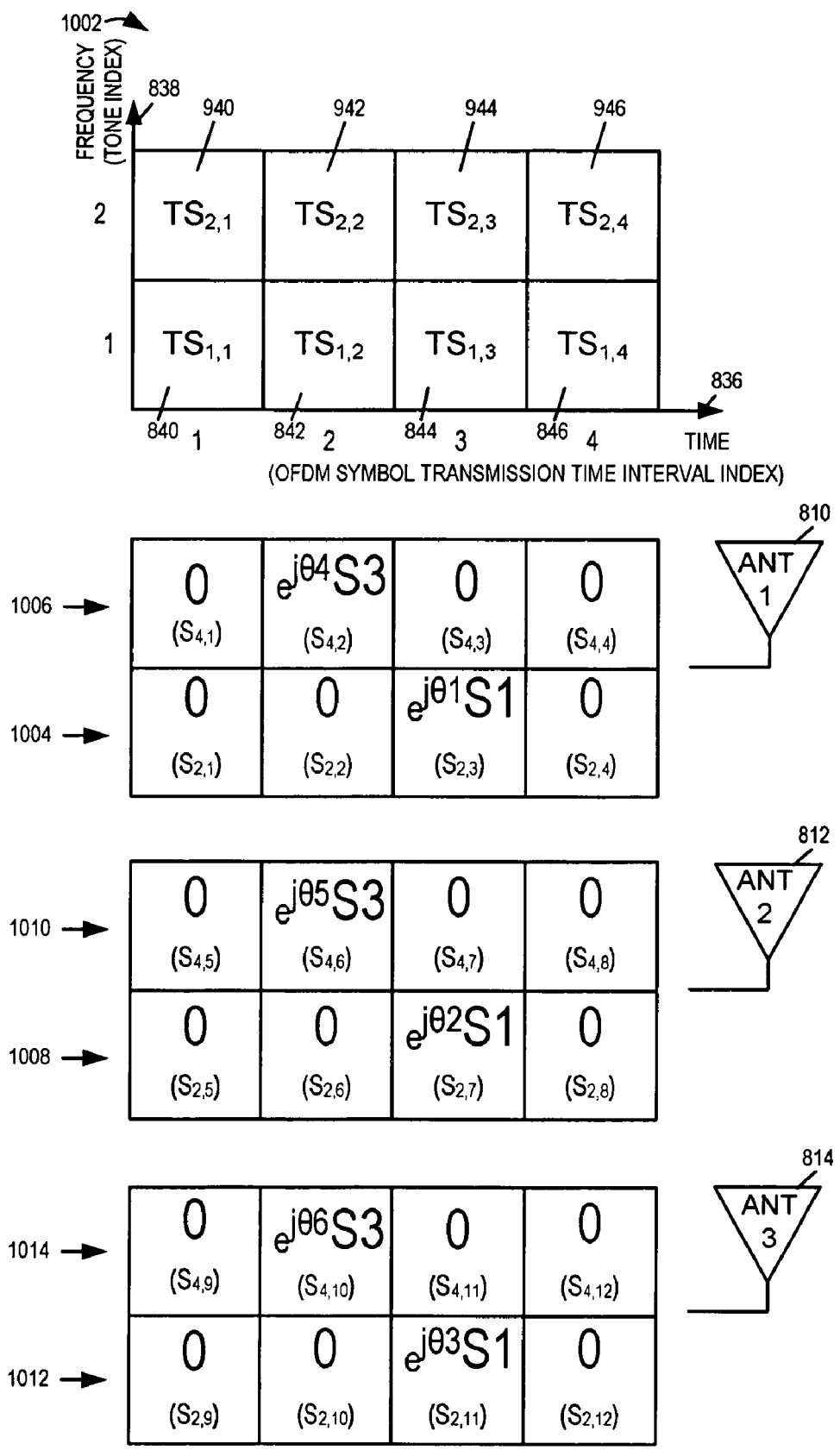
FIG. 10 illustrates exemplary superposition signaling utilizing multiple antennas.

FIG. 10 illustrates exemplary superposition signaling utilizing multiple antennas. FIG. 10 illustrates a composite of air link resources and transmitted signals represented in FIG. 8 and FIG. 9. FIG. 10 includes the addition of an exemplary second signal which is superimposed on the first transform result signal. Exemplary second signal includes components ($S_{2,1}$, $S_{2,2}$, $S_{2,3}$, $S_{2,4}$, $S_{2,5}$, $S_{2,6}$, $S_{2,7}$, $S_{2,8}$, $S_{2,9}$, $S_{2,10}$, $S_{2,11}$, $S_{2,12}$). FIG. 10 also includes the addition of an exemplary fourth signal which is superimposed on the second transform result signal. Exemplary fourth signal includes components ($S_{4,1}$, $S_{4,2}$, $S_{4,3}$, $S_{4,4}$, $S_{4,5}$, $S_{4,6}$, $S_{4,7}$, $S_{4,8}$, $S_{4,9}$, $S_{4,10}$, $S_{4,11}$, $S_{4,12}$).

The first transform result signal is a high power signal, while the second signal is a low power signal. The second transform result signal is a high power signal, while the fourth signal is a low power signal.

The air link resource graph 1002 plots time on the horizontal axis 836 vs frequency on the vertical axis 838. The same air link resources of eight tone-symbols ($TS_{1,1}$ 840, $TS_{1,2}$ 842, $TS_{1,3}$ 844, $TS_{1,4}$ 846, $TS_{2,1}$ 940, $TS_{2,2}$ 942, $TS_{2,3}$ 944, $TS_{2,4}$ 946) are used by the antennas (antenna 1 810, antenna 2 812, antenna 3 814) to transmit signals. Row 1004 illustrates signal transmitted by antenna 1 810, using tone with index=1 during four successive OFDM symbol transmission time intervals, using tone-symbols (840, 842, 844, 846), which represents the superposition of a portion of a first transform result signal (0, 0, $e^{j\theta 1}$ S1, 0), with components ($S_{2,1}$, $S_{2,2}$, $S_{2,3}$, $S_{2,4}$) of the second signal, respectively. Row 1006 illustrates signal transmitted by antenna 1 810, using tone with index=2 during four successive OFDM symbol transmission time intervals, using tone-symbols (940, 942, 944, 946), which represents the superposition of a portion of a second transform result signal (0, $e^{j\theta 4}$ S3, 0, 0), with components ($S_{4,1}$, $S_{4,2}$, $S_{4,3}$, $S_{4,4}$) of the fourth signal, respectively.

Row 1008 illustrates signal transmitted by antenna 2 812, using tone with index=1 during four successive OFDM symbol transmission time intervals, using tone-symbols (840, 842, 844, 846), which represents the superposition of a portion of a first transform result signal (0, 0, $e^{j\theta 2}$S1, 0), with components ($S_{2,5}$, $S_{2,6}$, $S_{2,7}$, $S_{2,8}$) of the second signal, respectively. Row 1010 illustrates signal transmitted by antenna 2 812, using tone with index=2 during four successive OFDM symbol transmission time intervals, using tone-symbols (940, 942, 944, 946), which represents the superposition of a portion of a second transform result signal (0, $e^{j\theta 5}$S3, 0, 0), with components ($S_{4,5}$, $S_{4,6}$, $S_{4,7}$, $S_{4,8}$) of the fourth signal, respectively.

Row 1012 illustrates signal transmitted by antenna 3 814, using tone with index=1 during four successive OFDM symbol transmission time intervals, using tone-symbols (840, 842, 844, 846), which represents the superposition of a portion of a first transform result signal (0, 0, $e^{j\theta 3}$S1, 0), with components ($S_{2,9}$, $S_{2,10}$, $S_{2,11}$, $S_{2,12}$) of the second signal, respectively. Row 1014 illustrates signal transmitted by antenna 3 814, using a tone with index=2 during four successive OFDM symbol transmission time intervals, using tone-symbols (940, 942, 944, 946), which represents the superposition of a portion of a second transform result signal (0, $e^{j\theta 6}$S3, 0, 0), with components ($S_{4,9}$, $S_{4,10}$, $S_{4,11}$, $S_{4,12}$) of the fourth signal, respectively.

Although illustrated in FIGS. 8, 9, and 10 for exemplary embodiments using three antennas, various other embodiments include two antennas or more than three antennas. In addition, in different embodiments, the amount of resources, e.g., number of tone-symbols used to carry the first transform result signal is a predetermined number which is different from four, e.g., two, eight, sixteen.

Figure 11:
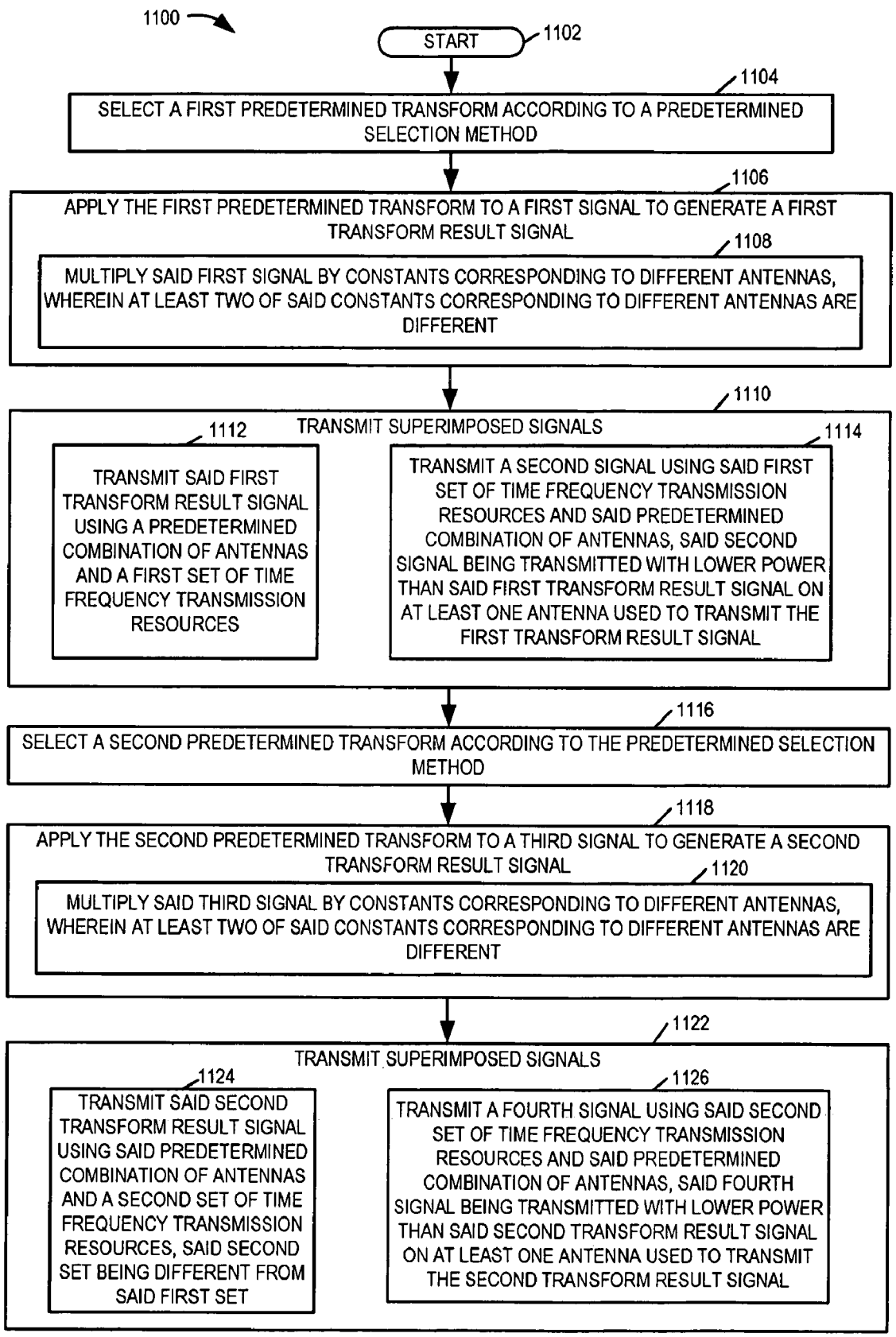
FIG. 11 is a flowchart of an exemplary method of operating an apparatus, e.g., a base station, in accordance with various embodiments.

FIG. 11 is a flowchart 1100 of an exemplary method of operating an apparatus, e.g., an access node such as a base station, in accordance with various embodiments. Operation starts in step 1102, where the apparatus is powered on and initialized and proceeds to step 1104. In step 1104, the apparatus selects a first predetermined transform according to a predetermined selection method. The selected first predetermined transform is, e.g., one of a plurality of a set of different transforms. In various embodiments, the selected first predetermined transform is linear and at least some of the set of different transforms are linearly independent. Then, in step 1106, the apparatus applies the first predetermined transform to a first signal to generate a first transform result signal. In various embodiments, the first signal communicates information using position modulation. In various embodiments, the selected first predetermined transform selection is independent of the position information to be communicated in the first signal. Step 1106 includes sub-step 1108, in which the apparatus multiples said first signal by constants corresponding to different antennas, wherein at least two of said constants corresponding to different antennas are different. Operation proceeds from step 1106 to step 1110.

In step 1110 the apparatus transmits superimposed signals. Step 1110 includes sub-steps 1112 and 1114. In sub-step 1112, the apparatus transmits the first transform result signal using a predetermined combination of antennas and a first set of time frequency transmission resources. In various embodiments, the first predetermined transform produces different outputs for at least two antennas included in said predetermined combination of antennas. In sub-step 1114, the apparatus transmits a second signal using said first set of time frequency transmission resources and said predetermined combination of antennas, said second signal being transmitted with lower power than said first transform result signal on at least one antenna used to transmit the first transform result signal. In various embodiments, the transmission power differential between transmitted non-null symbols in the first signal and transmitted symbols in the second signal is at least 3 dBs. Operation proceeds from step 1110 to step 1116.

In step 1116, the apparatus selects a second predetermined transform according to the predetermined selection method. In some embodiments, the first and second predetermined transforms are linearly independent. Then, in step 1118, the apparatus applies the second predetermined transform signal to a third signal to generate a second transform result signal. Step 1118 includes sub-step 1120. In sub-step 1120, the apparatus multiples the third signal by constants corresponding to different antennas, wherein at least two of said constants corresponding to different antennas are different. Operation proceeds from step 1118 to step 1122.

In step 1122, the apparatus transmits superimposed signals. Step 1122 includes sub-steps 1124 and 1126. In sub-step 1124, the apparatus transmits said second transform result signal using said predetermined combination of antennas and a second set of time frequency transmission resources, said second set of time frequency transmission resources being different from said first set of time frequency transmission resources. In some embodiments, the first and second sets of time frequency transmission resources are non-overlapping. In sub-step 1126, the apparatus transmits a fourth signal using said second set of time frequency transmission resources and said predetermined combination of antennas, said fourth signal being transmitted with lower power than said second transform result signal on at least one antenna used to transmit the second transform result signal.

In some embodiments, the information communicated by the first and third signals are directed to a first user and the information communicated by the second and fourth signals are directed to a second user. In some such embodiments, the second user is a user with better channel conditions, e.g., higher SNR, than the first user. In various embodiments, the apparatus selects first and second users as a function of SNR.

In some embodiments, the information communicated by the first and third signals are directed to a first set of users and the information communicated by the second and fourth signals are directed to a second set of users, which are a subset of the first set of users. In some such embodiments, the second set of users have better channel conditions, e.g., higher SNR, than members in the first set which are not member of the second set.

In some embodiments, the first and second transforms, are used for generating signals, e.g., first and second transform result signals, to be transmitted in first and second symbol transmission time periods, respectively, said second symbol transmission time period immediately following said first symbol transmission time period. In some embodiments, said first and second time frequency resources are sets of time and frequency resources in an OFDM communications system, e.g., sets of OFDM tone-symbols.

Figure 12:
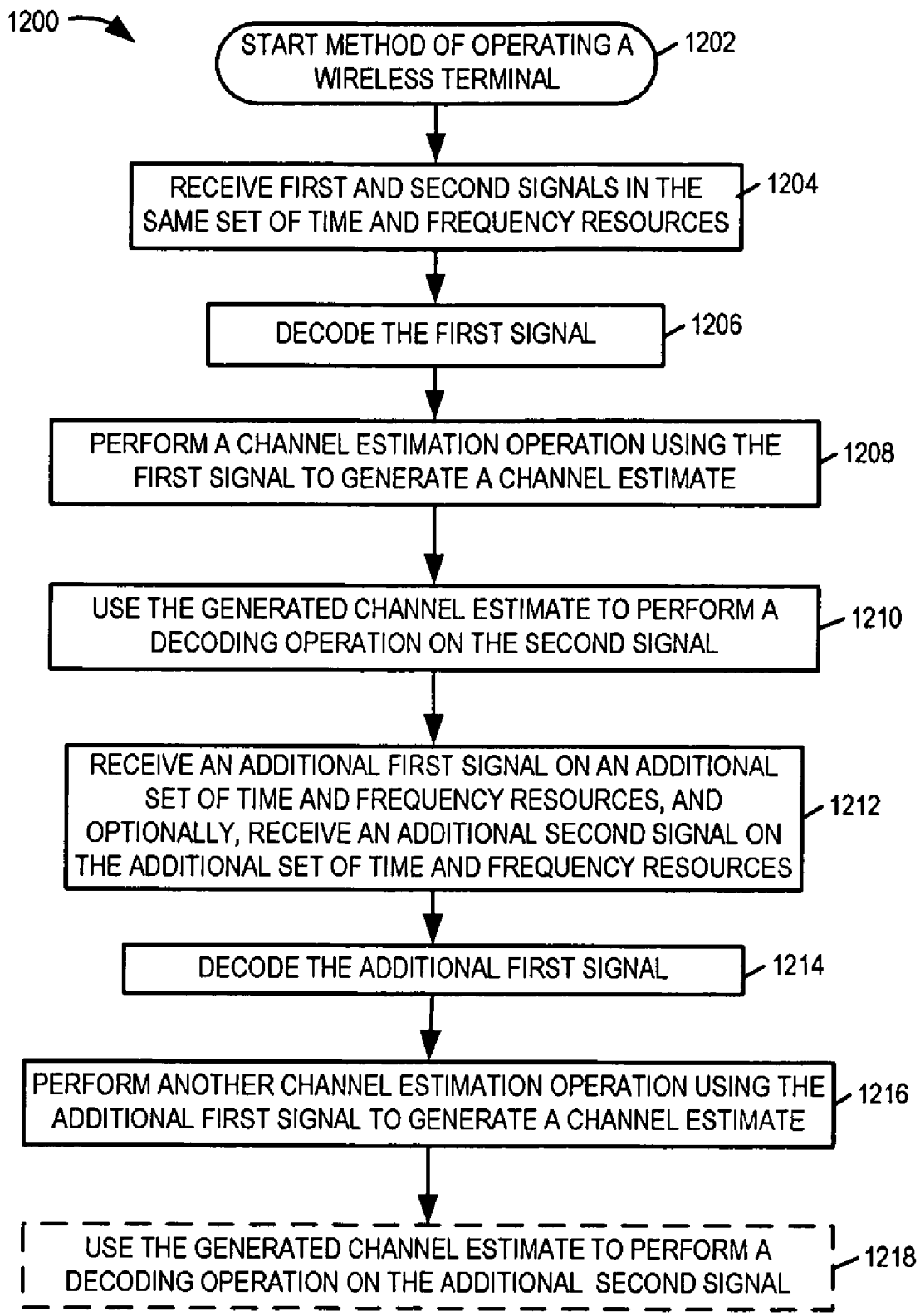
FIG. 12 is a flowchart of an exemplary method of operating a wireless terminal in accordance with various embodiments.

FIG. 12 is a flowchart 1200 of an exemplary method of operating a wireless terminal in accordance with various embodiments. Operation starts in step 1202, where the wireless terminal is powered on and initialized and proceeds to step 1204. In step 1204, the wireless terminal receives first and second signals in the same set of time and frequency resources. In some such embodiments, the first and second signals are orthogonal frequency division multiplexing (OFDM) signals. In various embodiments, the first signal conveys information using position modulation. In some OFDM embodiments, the set of time and frequency resources is a set of OFDM tone-symbols. In some such embodiments, the set of OFDM tone-symbols is in the same OFDM symbol transmission time interval. Position modulation includes communicating information using a placement of energy in a set of time and frequency resources. For example, the first signal includes a mixture of nulls and one or more non-null QPSK modulation symbols, and the placement of the one or more non-null QPSK modulation symbols in the set of time and frequency resources, e.g., set of OFDM tone-symbols, conveys information.

Then, in step 1206, the wireless terminal decodes the first signal. In some embodiments, decoding the first signal includes using apriori knowledge of an antenna combination set used to transmit the first signal. In some such embodiments, decoding the first signal includes using apriori knowledge of a transform corresponding to the antenna combination which was used in generating the first signal.

Operation proceeds from step 1206 to step 1208. In step 1208, the wireless terminal performs a channel estimation operation using the first signal to generate a channel estimate. In some embodiments, decoding the first signal in step 1206 is performed using a first channel estimate, and the generated channel estimate from step 1208 is a second channel estimate. In some such embodiments, the second channel estimate is an improved estimate to which the first channel estimate corresponds. In various embodiment, the wireless terminal includes a plurality of receivers, each of the plurality of receivers corresponding to a different receive antenna, and the method further comprises generating different channel estimates for each of the plurality of receivers.

Operation proceeds from step 1208 to step 1210, in which the wireless terminal uses the generated channel estimate to perform a decoding operation on the second signal. Operation proceeds from step 1210 to step 1212. In step 1212, the wireless terminal receives and additional first signal on an additional set of time and frequency resources. In various embodiments, the additional first signal has been generated by a base station using a different transform than is used to generate the first signal. In some embodiments, in step 1212, the wireless terminal also receives an additional second signal on the additional set of time and frequency resources. Operation proceeds from step 1212 to step 1214.

In step 1214, the wireless terminal decodes the additional first signal, and then in step 1216 the wireless terminal performs another channel estimation operation using said additional first signal to generate the channel estimate. In some such embodiments, the wireless terminal uses both information derived from the first decoded signal and the additional decoded signal in generating the another channel estimate.

In some embodiments, operation proceeds from step 1216 to step 1218. In step 1218, the wireless terminal uses the generated another channel estimate to perform a decoding operation on the additional second signal.

In various embodiments, the wireless terminal, selects a first inverse transform from a plurality of stored inverse transforms and uses the selected first inverse transform to decode the first signal in step 1206, and the wireless terminal, selects a second inverse transform from a plurality of stored inverse transforms and uses the selected second inverse transform to decode the additional first signal in step 1214, wherein the first and second inverse transforms are different. For example, the first inverse transform corresponds to the transform used by the base station to generate the first signal, and the second inverse transform corresponds to the transform used by the base station to generate the additional first signal. The base station and the wireless terminal have an understanding as to which transform is to be used by the base station for a particular set of time and frequency resources, and thus the wireless terminal can apply an appropriate inverse transform to recover the information.

A standard baseband model for wireless OFDM systems is $$y(\omega_i) = h(\omega_i)x(\omega_i) + n(\omega_i)$$

where $\omega_1, \ldots, \omega_k$ are k carrier frequencies, $h(\omega_i)$ is the complex channel gain on carrier i, $x(\omega_i)$ is the transmitted complex signal on carrier i, and $n(\omega_i)$ is the additive noise on carrier i. Each of the above is also a function of time. The transmitted signal for a fixed time, as above, is referred to as an OFDM symbol.

OFDM is used for multi-user wireless systems such as Wide Area Networks. In this case a signal may be sent to a receiver, associated to a particular user, on a subset of the carriers over a segment of time. To mitigate interference in such systems, hopping is often used. In a hopped system the set of carriers used to carry a signal to a particular receiver changes over time. Typically, in a segment of transmission to a particular user, the number of carriers used does not change during the segment. In block-hopped systems the carriers used in a given segment for a given OFDM symbol are partitioned into contiguous subsets. Further each subset may be occupied by the signal for more than one OFDM symbol, creating a rectangle or block of symbols in the time frequency plane.

In a block-hopped OFDM scheme one can use superposition by position signaling to provide additional pseudo-pilots for the superior receiver. If the superior receiver is being transmitted to in MIMO mode then the pseudo-pilots should sample the channel matrix.

Consider an example. A 2×2 MIMO system. Let a block be 8×8. In each 4×1 sub-block we transmit one relatively high-power QPSK symbol, intended for the inferior receiver. Let X represent the signal over the block. The first antenna transmits $H^{\alpha_1} \otimes X$ where $\otimes$ represent point-wise complex multiplication. The second antenna transmits $H^{\alpha_2} \otimes X$. The functions $H^{\alpha_1}$ and $H^{\alpha_2}$ would be known at both the transmitter and the receiver. A convenient practical choice would be to use QPSK symbols $\{1,1,j,-j\}$ for $H^{\alpha_1}$ and $H^{\alpha_2}$. This simplifies the multiplication by H at the transmitters and the local inversion of H at the receiver. If a high-power QPSK symbol is transmitted in position i,j, and channel functions are $h^{a,b}$, then receiver, $b_1$ and receiver $b_2$ respectively see $$(h^{\alpha_1,b_1}(i,j) H^{\alpha_1}(i,j) + h^{\alpha_2,b_1}(i,j) H^{\alpha_2}(i,j))X(i,j)$$

$$(h^{\alpha_1,b_2}(i,j) H^{\alpha_1}(i,j) + h^{\alpha_2,b_2}(i,j) H^{\alpha_2}(i,j))X(i,j)$$

Assume now that X has been successfully decoded by the superior receiver and let $\|X_{i,j}\| := P_X$. It is apparent that the superior receiver now has an estimate of $$h(i,j)H(i,j).$$

Typically $h(i,j)$ will be smooth in i and j due to local coherence of the channel. The function H need not be smooth. Using this one can form local estimates for h.

For example, suppose i', j' is close to i,j and we assume $h(i,j) = h(i',j')$. Then we have $$h(i,j)[H(i,j)H(i',j')]$$

If the matrix $[H(i,j)H(i',j')]$ is invertible—and it would be made so by design—then we can multiply on the right by this inverse and recover $h(i,j) = h(i',j')$. In practice the values $h(i,j)H(i,j)$—of would be observed in the presence of receiver noise and other distortions. These values would be used to form an estimate of h. Many different techniques can be used for forming the estimate h. Two examples are parametric model fitting (e.g. assume h is affine in i,j), and least squares fitting with smoothness assumptions.

For the superior receiver an estimate of h across the entire block is now available and may be used to demodulate the symbols where the inferior user's signal was set to 0. The superior receiver's signal may be different from the two antennas. In this case MIMO capacities will be available to the superior receiver.

The basic concept can be generalized to more than 2 transmit antennas.

It would be convenient to choose H constant in position block. That way, local inverses are fixed and can be pre-computed. It further has the advantage that the channel seen by the inferior user in a given position block is constant, improving the detection of position information. A small fraction of the high-power inferior receiver symbols would be known a priori. This would allow for an initial estimate of h. The inferior user takes a small hit in that all of h needs to be estimated.

Inferior receiver related issues are now described. For the inferior receiver, in low SNR, one transmits the same data on both antennas. If the 2×2 channel matrix is h then the received signal (excluding noise) on antenna 1 is $$Y = [h_{1,1} \quad h_{1,2}] \begin{bmatrix} S^{\alpha_1} \otimes X \\ S^{\alpha_2} \otimes X \end{bmatrix} (h_{1,1} \otimes S^{\alpha_1} + h_{1,2} \otimes S^{\alpha_2})X$$

The receiver will form an estimate of h, denoted $\hat{h}$ and combine them, using its knowledge of $S^{\alpha_1}$ and $S^{\alpha_2}$ to form the combined channel estimate $$\hat{h}^{60} := (\hat{h}_{1,1} \otimes S^{\alpha_1} + \hat{h}_{1,2} \otimes S^{\alpha_2})$$

Derotation is performed by computing $$(\hat{h}^\alpha)^* \otimes Y$$

The case of alternative pilots shall now be described. The communications system might have dedicated pilots for normal non-MIMO transmission. In this case receivers independently have an estimate of $$hV$$

for some fixed V. An example is V=[1,1] which means pilots are transmitted identically from both transmit antennas. If both receivers are not using MIMO then we should set. $S^{\alpha_1}=S^{\alpha_2}=1$ in this case. The inferior receiver's signal can still be used to improve the channel estimate.

When the superior signal is MIMO then it may be preferable to choose $S^{\alpha_1}$ and $S^{\alpha_2}$ to better measure the component orthogonal to V, especially for embedded pilots. Alternatively we may choose to have largely (e.g. in most locations) $S^{\alpha_1}=S^{\alpha_2}$ so that decoding of the inferior signal can commence without any additional pilots. Signals in the orthogonal space can still contain position information, but phase information will be weak. It can simply be erased, or known a priori.

Superior receiver related issues are now described. The assumption is that the superior receiver is in a better channel setting than the inferior receiver. Thus, the superior receiver can decode the inferior receiver's signal with high reliability. Once X is known the superior receiver uses it to form an estimate of h. When $S^{\alpha_1}$ and $S^{\alpha_2}$ are linearly independent then the receiver can form an estimate of the entire channel matrix h. If the superior user's signal is not MIMO encoded then $S^{\alpha_1}$ and $S^{\alpha_2}$ may be linearly independent. Leaving them independent, however, may still offer diversity gains since different combinations of the elements of h are used. The price for this is loss in capacity, due to the need to estimate the orthogonal channel component, to the inferior user.

In various embodiments, a transmission to two or more receivers uses two or more antennas.

In various embodiments, information to the inferior user is the same on both antennas but subject to a rotation known to both transmitter and receiver.

In some Block OFDM schemes, symbols to the inferior receiver have higher power. In some such embodiments, information is conveyed in the position of those signals.

In various embodiments, remaining symbols are used for transmission to superior user. Different information may, and sometimes is, transmitted from the two antennas.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, generation of a signal using position coding modulation, selection of a transform to use, implementation of a selected transform, superposition of signals, scheduling as a function of user channel conditions, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method comprising:
    applying a first predetermined transform to a first signal to generate a first transform result signal, said predetermined transform producing different outputs for at least two different antennas included in a predetermined combination of antennas;
    transmitting said first transform result signal using said predetermined combination of antennas and a first set of time and frequency transmission resources; and
    transmitting a second signal using said first set of time and frequency transmission resources and said predetermined combination of antennas, said second signal being transmitted with lower power than said first transform result signal on at least one antenna used in transmitting the first transform result signal.

2. The method of claim 1, wherein said first transform result signal includes a plurality of different portions corresponding to different antennas.

3. The method of claim 1, wherein said predetermined transform is one of a plurality of a set of different transforms, the method further comprising:
    prior to said applying a first predetermined transform, selecting the first predetermined transform according to a predetermined selection method.

4. The method of claim 1, wherein applying said first predetermined transform includes multiplying said first signal by constants corresponding to different antennas, wherein at least two of said constants corresponding to different antennas are different.

5. The method of claim 1, wherein the first signal communicates information using position modulation.

6. The method of claim 1, further comprising:
    applying a second predetermined transform to a third signal to generate a second transform result signal; and
    transmitting said second transform result signal using said predetermined combination of antennas and a second set of time and frequency transmission resources, said second set of time and frequency transmission resources being different from said first set of time and frequency transmission resources.

7. The method of claim 6, wherein said second transform result signal includes a plurality of different portions corresponding to different antenna elements.

8. The method of claim 6, wherein said first and second predetermined transforms are linearly independent.

9. The method of claim 8, further comprising:
    transmitting a fourth signal on said second set of time and frequency transmission resources.

10. The method of claim 9 wherein the information communicated by said first and third signals are directed to a first user; and
    wherein the information communicated by said second and fourth signals are directed to a second user.

11. The method of claim 9, wherein the first and third signals are directed to a first set of users and wherein said second and fourth signals are directed to a second set of users which are a subset of the first set of users.

12. The method of claim 11, wherein the second set of users have better channel conditions than the users in the first set which are not members of the second set.

13. The method of claim 1, wherein the transmission power differential between non-null transmitted symbols in the first transform result signal and transmitted signals in the second signal is at least 3 dB.

14. The method of claim 5, wherein said position modulation communicates information by transmitting power on at most half of the symbol transmission units available in said first set of time and frequency transmission resources.

15. The method of claim 1 wherein said first predetermined transform is a fixed matrix multiplication using a plurality of predetermined constant complex multiplier values.

16. The method of claim 6, wherein, said first and second sets of time and frequency resources are non-overlapping.

17. The method of claim 6, wherein said first and second transforms are used for generating first and second transform result signals to be transmitted in first and second symbol transmission time periods, respectively, said second symbol transmission time period immediately following said first symbol transmission time period.

18. The method of claim 17, wherein said set of first and second sets of time and frequency transmission resources are sets of time and frequency resources in an OFDM communications system.

19. An apparatus for use in an access point that includes a plurality of antenna elements, the apparatus comprising:
a transform module for applying a first predetermined transform to a first signal to generate a first transform result signal to be used to produce a combined signal; and
a superposition module for combining said first transform result signal with a second signal to produce a combined signal, said second signal having a lower power level than said first signal; and
a transmission control module for controlling transmission of different portions of said combined signal using different antenna elements on a set of time and frequency transmission resources.

20. The apparatus of claim 19, wherein said lower power level is a per transmission unit power level for non-null signal portions.

21. The apparatus of claim 19, wherein said transform module produces different outputs for at least two different antenna elements included in said plurality of antenna elements.

22. The apparatus of claim 19, wherein said first transform result signal includes a plurality of different portions corresponding to different antenna elements.

23. The apparatus of claim 19, wherein said first predetermined transform is one of a plurality of a set of different transforms, the base station further including:
stored information specifying a plurality of different transforms; and
a selection module for selecting the first transform from said plurality of different transforms.

24. The apparatus of claim 21, wherein said transform module multiplies said first signal by constants corresponding to different antenna elements, and
wherein at least two of said constants corresponding to different antenna elements are different.

25. The apparatus of claim 19, further comprising:
a high power signal generation module, and wherein said high power signal generation module includes:
a position coding module used in generating said high power signal, said high power signal communicating information using position modulation.

26. The apparatus of claim 25, wherein said high power signal generation module further includes:
a QPSK module for generating non-null high power QPSK signals.

27. The apparatus of claim 25, wherein said high power signal generation module generates said first signal.

28. The apparatus of claim 19, wherein said transform module:
applies a second predetermined transform to a third signal to generate a second transform result signal; and
wherein said transmission control module controls transmission of different portions of said second transform result using different antenna elements on a second set of time and frequency transmission resources, said second set of time frequency resources being different from said set of time frequency resources.

29. The apparatus of claim 28, wherein said second transform result signal includes a plurality of different portions corresponding to different antenna elements.

30. The apparatus of claim 28, wherein said first and second predetermined transforms are linearly independent.

31. The apparatus of claim 30, wherein said transform control module also controls transmission of a fourth signal using the second set of time and frequency resources.

32. The apparatus of claim 31, wherein the information communicated by the first and third signals are directed to a first user, and wherein the information communicated by the second and fourth signals are directed to a second user.

33. The apparatus of claim 31, wherein the first and third signals are directed to a first set of users and wherein said second and fourth signals are directed to a second set of users which are a subset of the first set of users.

34. The apparatus of claim 33, wherein the second set of users have better channel conditions than the users in the first set which are not members of the second set.

35. The apparatus of claim 28, wherein, said set of time and frequency resources and second set of time and frequency resources are non-overlapping.

36. The apparatus of claim 28, wherein said first and second transforms are used for generating first and second transform result signals to be transmitted in first and second symbol transmission time periods, respectively, said second symbol transmission time period immediately following said first symbol transmission time period.

37. The apparatus of claim 36, wherein said set of first and second sets of time and frequency transmission resources are sets of orthogonal frequency division multiplexing (OFDM) time and frequency resources, the base station further including:
an OFDM transmitter responsive to said transmission control module.

38. The apparatus of claim 37, wherein sets of OFDM time and frequency resources are sets of OFDM tone-symbols.

39. An apparatus for use in an access point that includes a plurality of means for radiating electromagnetic waves, the apparatus comprising:
means for implementing a transform for applying a first predetermined transform to a first signal to generate a first transform result signal to be used to produce a combined signal;
means for superposing signals for combining said first transform result signal with a second signal to produce a combined signal, said second signal having a lower power level than said first signal; and means for controlling transmission for controlling transmission of different portions of said combined signal using different means for radiating electromagnetic waves on a set of time and frequency transmission resources.

40. The apparatus of claim 39, wherein said lower power level is a per transmission unit power level for non-null signal portions.

41. The apparatus of claim 39, wherein said means for implementing a transform produces different outputs for at least two different means for radiating electromagnetic waves included in said plurality of means for radiating electromagnetic waves.

42. The apparatus of claim 39, wherein said first transform result signal includes a plurality of different portions corresponding to different means for radiating electromagnetic waves.

43. The apparatus of claim 39, wherein said first predetermined transform is one of a plurality of a set of different transforms, the base station further including:
stored information specifying a plurality of different transforms; and
means for selecting a transform for selecting the first transform from said plurality of different transforms.

44. The apparatus of claim 41, wherein said means for implementing a transform multiplies said first signal by constants corresponding to different means for radiating electromagnetic waves, wherein at least two of said constants corresponding to different means for radiating electromagnetic waves are different.

45. The apparatus of claim 39, further comprising:
means for generating a high power signal, and wherein said means for generating a high power signal includes:
means for performing position coding modulation used in generating said high power signal, said high power signal communicating information using position modulation.

46. The apparatus of claim 45, wherein said means for generating a high power signal further includes:
means for generating QPSK modulation symbols for generating non-null high power QPSK signals.

47. A computer readable medium embodying machine executable instruction for controlling an apparatus to implement a method, the method comprising:
applying a first predetermined transform to a first signal to generate a first transform result signal wherein said predetermined transform produces different outputs for at least two different antennas included in a predetermined combination of antennas;
transmitting said first transform result signal using said predetermined combination of antennas and a first set of time and frequency transmission resources; and
transmitting a second signal using said first set of time and frequency transmission resources and said predetermined combination of antennas, said second signal being transmitted with lower power than said first transform result signal on at least one antenna used in transmitting the first transform result signal.

48. The computer readable medium of claim 47, wherein said first transform result signal includes a plurality of different portions corresponding to different antennas.

49. The computer readable medium of claim 47, wherein said predetermined transform is one of a plurality of a set of different transforms, the computer readable medium further embodying machine executable instructions for:
selecting the first predetermined transform according to a predetermined selection method, prior to said step of applying a first predetermined transform.

50. The computer readable medium of claim 47, further embodying machine executable instructions for:
multiplying said first signal by constants corresponding to different antennas as part of said step of applying a first predetermined transform, wherein at least two of said constants corresponding to different antennas are different.

51. The computer readable medium of claim 47, wherein the first signal communicates information using position modulation.

52. An apparatus comprising:
a processor configured to:
apply a first predetermined transform to a first signal to generate a first transform result signal wherein said predetermined transform produces different outputs for at least two different antennas included in a predetermined combination of antennas;
transmit said first transform result signal using said predetermined combination of antennas and a first set of time and frequency transmission resources; and
transmit a second signal using said first set of time and frequency transmission resources and said predetermined combination of antennas, said second signal being transmitted with lower power than said first transform result signal on at least one antenna used in transmitting the first transform result signal.

53. The apparatus of claim 52, wherein said first transform result signal includes a plurality of different portions corresponding to different antennas.

54. The apparatus of claim 52, wherein said predetermined transform is one of a plurality of a set of different transforms, and wherein the processor is further configured to:
select the first predetermined transform according to a predetermined selection method, prior to said step of applying a first predetermined transform.

55. The apparatus of claim 52, wherein said processor is further configured to:
multiply said first signal by constants corresponding to different antennas as part of said step of applying a first predetermined transform, wherein at least two of said constants corresponding to different antennas are different.

56. The apparatus of claim 52, wherein the first signal communicates information using position modulation.

57. A method of operating a wireless terminal comprising:
receiving first and second signals on the same set of time and frequency resources, decoding said first signal based on apriori knowledge of an antenna combination set used to transmit said first signal;
performing a channel estimation operation using said first signal to generate a channel estimate; and
decoding the second signal based on the generated channel estimate.

58. The method of claim 57, wherein said first signal conveys information using position modulation.

59. The method of claim 58, further comprising:
receiving an additional first signal on an additional set of time and frequency resources; and
wherein performing a channel estimation operation further includes using said additional first signal, in addition to said first signal to generate said channel estimate.

60. The method of claim 59, wherein said additional first signal is generated using a different transform than is used to generated said first signal.

61. The method of claim 58, wherein said decoding of said first signal is performed using a first channel estimate and wherein said generated channel estimate is a second channel estimate.

62. The method of claim 61, wherein said second channel estimate is an improved estimate of the same channel to which said first channel estimate corresponds.

63. The method of claim 58, wherein decoding said first signal further includes using apriori knowledge of a transform corresponding to said antenna combination which was used in generating said first signal.

64. The method of claim 58, wherein said wireless terminal includes a plurality of receivers, the method further comprising:
generating different channel estimates for each of said plurality of receivers.

65. The method of claim 58, wherein said first and second signals are orthogonal frequency division multiplexing (OFDM) signals.

66. The method of claim 58, wherein said position modulation includes communicating information using a placement of energy in said set of time and frequency resources.

67. A wireless terminal comprising:
a receiver for receiving first and second signals on the same set of time and frequency resources, a first signal recovery module for decoding said first signal;
a channel estimation generation module for generating a channel estimate using said first signal based on apriori knowledge of an antenna combination set used to transmit said first signal; and
a second signal recovery module for performing a decoding operation on said second signal using the generated channel estimate to perform a decoding operation on the second signal.

68. The wireless terminal of claim 67, wherein said first signal recovery module includes a position decoding module for identifying the position of high power modulation symbols of said first signal in said set of time and frequency resources and for recovering information conveyed by the position of the identified high power modulation symbols.

69. The wireless terminal of claim 68, wherein said receiver module receives an additional first signal on an additional set of time and frequency resources; and
wherein said channel estimation module uses said additional first signal in addition to said first signal to generate said channel estimate.

70. The wireless terminal of claim 69, wherein said first recovery module uses a first inverse transform to process said first received signal and uses a second inverse transform to process said first additional received signal, said first and second inverse transforms being different.

71. The wireless terminal of claim 68, wherein said decoding of said first signal is performed using a first channel estimate and wherein said generated channel estimate is a second channel estimate.

72. The wireless terminal of claim 71, wherein said second channel estimate is an improved estimate of the same channel to which said first channel estimate corresponds.

73. The wireless terminal of claim 68, further comprising:
stored antenna combination information providing information on different antenna combinations used to transmit information to the wireless terminal; and
wherein decoding said first signal includes using said stored antenna combination information to decode said first signal.

74. The wireless terminal of claim 73, further comprising:
stored transform information indicating different transforms used for different transmitter antenna combinations.

75. The wireless terminal of claim 73, wherein said wireless terminal includes a plurality of receivers, said receiver being one of said plurality of receivers; and
wherein said channel estimation module generates different channel estimates for each of said plurality of receivers.

76. The wireless terminal of claim 68, wherein said first and second signals are orthogonal frequency division multiplexing (OFDM) signals; and
wherein said receiver is an OFDM receiver.

77. A wireless terminal comprising:
receiver means for receiving first and second signals on the same set of time and frequency resources, means for recovering a first type of signal for decoding said first signal based on apriori knowledge of an antenna combination set used to transmit said first signal;
channel estimation means for generating a channel estimate using said first signal; and
means for recovering a second type of signal for performing a decoding operation on said second signal using the generated channel estimate to perform a decoding operation on the second signal.

78. The wireless terminal of claim 77, wherein said means for recovering a first type of signal includes a means for performing position decoding for identifying the position of high power modulation symbols of said first signal in said set of time and frequency resources and for recovering information conveyed by the position of the identified high power modulation symbols.

79. The wireless terminal of claim 78, wherein said receiver means receives an additional first signal on an additional set of time and frequency resources; and
wherein said channel estimation means uses said additional first signal in addition to said first signal to generate said channel estimate.

80. The wireless terminal of claim 79, wherein said means for recovering a first type of signal uses a first inverse transform to process said first received signal and uses a second inverse transform to process said first additional received signal, said first and second inverse transforms being different.

81. The wireless terminal of claim 78, wherein said decoding of said first signal is performed using a first channel estimate and wherein said generated channel estimate is a second channel estimate.

82. The wireless terminal of claim 81, wherein said second channel estimate is an improved estimate of the same channel to which said first channel estimate corresponds.

83. The wireless terminal of claim 78, further comprising:
storage means for storing antenna combination information providing information on different antenna combinations used to transmit information to the wireless terminal; and
wherein decoding said first signal includes using said stored antenna combination information to decode said first signal.

84. The wireless terminal of claim 83, wherein said storage means further includes:
stored transform information indicating different transforms used for different transmitter antenna combinations.

85. A computer readable medium embodying machine executable instruction for controlling a wireless terminal to implement a method, the method comprising:
  receiving first and second signals on the same set of time and frequency resources, decoding said first signal based on apriori knowledge of an antenna combination set used to transmit said first signal;
  performing a channel estimation operation using said first signal to generate a channel estimate; and
  using the generated channel estimate to perform a decoding operation on the second signal.

86. The computer readable medium of claim 85, wherein said first signal conveys information using position modulation.

87. The computer readable medium of claim 86, further embodying machine executable instructions for:
  receiving an additional first signal on an additional set of time and frequency resources; and
  using said additional first signal, in addition to said first signal to generate said channel estimate as part of said step of performing a channel estimation operation.

88. The computer readable medium of claim 87, wherein said additional first signal is generated using a different transform than is used to generated said first signal.

89. The computer readable medium of claim 86, further embodying machine executable instructions for:
  performing said decoding of said first signal using a first channel estimate, wherein said generated channel estimate is a second channel estimate.

90. The computer readable medium of claim 89, wherein said second channel estimate is an improved estimate of the same channel to which said first channel estimate corresponds.

91. The computer readable medium of claim 86, further embodying machine executable instructions for:
  using a priori knowledge of an antenna combination set to used transmit said first signal as part of said decoding of said first signal.

92. The computer readable medium of claim 91, further embodying machine executable instructions for:
  using a priori knowledge of a transform corresponding to said antenna combination which was used in generating said first signal, as part of said step of decoding said first signal.

93. An apparatus comprising:
a processor configured to:
  receive first and second signals on the same set of time and frequency resources, decode said first signal based on apriori knowledge of an antenna combination set used to transmit said first signal;
  perform a channel estimation operation using said first signal to generate a channel estimate; and
  use the generated channel estimate to perform a decoding operation on the second signal.

94. The apparatus of claim 93, wherein said first signal conveys information using position modulation.

95. The apparatus of claim 94, wherein said processor is further configured to: receive an additional first signal on an additional set of time and frequency resources; and
  use said additional first signal, in addition to said first signal to generate said channel estimate as part of said step of performing a channel estimation operation.

96. The apparatus of claim 95, wherein said additional first signal is generated using a different transform than is used to generated said first signal.

97. The apparatus of claim 94, wherein said processor is further configured to:
  perform said decoding of said first signal using a first channel estimate, wherein said generated channel estimate is a second channel estimate.

98. The apparatus of claim 97, wherein said second channel estimate is an improved estimate of the same channel to which said first channel estimate corresponds.

99. The apparatus of claim 93, wherein said processor is further configured to:
  use a priori knowledge of a transform corresponding to said antenna combination which was used in generating said first signal, as part of said step of decoding said first signal.

* * * * *